United States Patent
Watanabe

(10) Patent No.: US 7,583,421 B2
(45) Date of Patent: Sep. 1, 2009

(54) PRINT DATA GENERATING APPARATUS, IMAGE PROCESSING APPARATUS, AND COMPUTER USABLE MEDIUM THEREFOR

(75) Inventor: Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 373 days.

(21) Appl. No.: 11/709,146

(22) Filed: Feb. 22, 2007

(65) Prior Publication Data

US 2007/0201062 A1 Aug. 30, 2007

(30) Foreign Application Priority Data

Feb. 24, 2006 (JP) ............... 2006-047713

(51) Int. Cl.
- *G06F 15/00* (2006.01)
- *G03F 3/08* (2006.01)
- *H04N 1/40* (2006.01)
- *B41J 2/205* (2006.01)
- *B41J 2/17* (2006.01)
- *B41J 2/01* (2006.01)
- *G06K 9/00* (2006.01)

(52) U.S. Cl. ............... 358/518; 358/1.9; 358/3.23; 347/15; 347/95; 347/103; 382/162; 382/167

(58) Field of Classification Search ............... 358/518, 358/1.9, 3.23; 347/15, 95, 103; 382/162, 382/167
See application file for complete search history.

(56) References Cited

U.S. PATENT DOCUMENTS 5,481,662 A 1/1996 Kouyama et al.
7,237,861 B2 * 7/2007 Suzuki et al. ............... 347/15
7,419,257 B2 * 9/2008 Mouri et al. ............... 347/103
2002/0060797 A1 5/2002 Namikata
2002/0196346 A1 12/2002 Nishio et al.
2005/0162451 A1 7/2005 Suzuki et al.
2005/0200679 A1 * 9/2005 Falser et al. ............... 347/104

FOREIGN PATENT DOCUMENTS

| EP | 0 845 364 A2 | 6/1998 |
|---|---|---|
| JP | A 7-110568 | 4/1995 |
| JP | A 7-114241 | 5/1995 |
| JP | A 2001-253065 | 9/2001 |
| JP | A 2002-38063 | 2/2002 |
| JP | A 2002-46303 | 2/2002 |
| JP | A 2004-25603 | 1/2004 |
| JP | A 2004-174971 | 6/2004 |
| JP | A 2005-262553 | 9/2005 |

\* cited by examiner

*Primary Examiner*—Edward L Coles
*Assistant Examiner*—Charlotte M Baker
(74) *Attorney, Agent, or Firm*—Oliff & Berridge, PLC

(57) ABSTRACT

A print data generating apparatus to generate print data which is used for printing in a printing apparatus based on image data is provided. The print data generating apparatus comprises a conversion table storing system, which stores a white conversion table defining a white colorant level corresponding to color information of each of a plurality of pixels that configure the image data, the white colorant level indicating a level of white colorant to be used in the printing apparatus, a colorant data generating system, which generates white colorant data wherein color information of each of the plurality of pixels is converted into the white colorant level according to the white conversion table, and a print data generating system, which generates white print data to be used for printing with the white colorant in the printing apparatus based on the white colorant data.

18 Claims, 12 Drawing Sheets

|  sRGB VALUE  |||  WHITE CONVERSION TABLE  |  COLOR CONVERSION TABLE  ||||
|---|---|---|---|---|---|---|---|
| R | G | B | W | C | M | Y | K |
| 0 | 0 | 0 | 0 | 0 | 0 | 0 | 0 |
| 64 | 0 | 0 | 30 | 0 | 32 | 45 | 0 |
| 128 | 0 | 0 | 100 | 0 | 101 | 123 | 0 |
| 192 | 0 | 0 | 150 | 0 | 190 | 210 | 0 |
| 255 | 0 | 0 | 255 | 0 | 255 | 250 | 0 |
| 0 | 64 | 0 | 32 | 50 | 23 | 10 | 10 |
| 64 | 64 | 0 | 120 | 100 | 32 | 45 | 35 |
| 128 | 64 | 0 | 145 | 80 | 62 | 70 | 55 |
| 192 | 64 | 0 | 180 | 20 | 102 | 190 | 15 |
| 255 | 64 | 0 | 255 | 0 | 180 | 250 | 0 |
| ... | ... | ... | ... | ... | ... | ... | ... |
| 0 | 192 | 255 | 250 | 255 | 20 | 0 | 0 |
| 64 | 192 | 255 | 251 | 190 | 21 | 0 | 0 |
| 128 | 192 | 255 | 253 | 128 | 31 | 0 | 0 |
| 192 | 192 | 255 | 254 | 54 | 25 | 0 | 0 |
| 255 | 192 | 255 | 255 | 0 | 20 | 0 | 0 |
| 0 | 255 | 255 | 255 | 255 | 10 | 0 | 0 |
| 64 | 255 | 255 | 251 | 198 | 2 | 0 | 0 |
| 128 | 255 | 255 | 245 | 130 | 0 | 0 | 0 |
| 192 | 255 | 255 | 250 | 55 | 0 | 0 | 0 |
| 255 | 255 | 255 | 255 | 0 | 0 | 0 | 0 |

FIG. 7

PRINT DATA GENERATING APPARATUS, IMAGE PROCESSING APPARATUS, AND COMPUTER USABLE MEDIUM THEREFOR

CROSS REFERENCE TO RELATED APPLICATION

This application claims priority from Japanese Patent Application No. 2006-047713, filed on Feb. 24, 2006, the entire subject matter of which is incorporated herein by reference.

BACKGROUND

1. Technical Field

Aspects of the present invention relate to a print data generating apparatus, an image processing apparatus, and print data generating programs and image processing programs therefor capable of creating print data which is used for printing in the printing apparatus, and more specifically, creating print data suitable for a printing operation using white ink in the printing apparatus.

2. Related Art

Conventionally, in an inkjet printing apparatus that performs recording by ejecting inks onto a recording medium, the inks are ejected from ejecting nozzles, which are provided at an end of ink channels, by leading the inks from ink reservoirs to a plurality of ejecting channels in inkjet heads, and by selectively activating actuators (e.g., heating elements, piezoelectric elements, and the like). When an image is formed in colors, each of pixels composing the image is resolved, for example, into the three primary colors, which are cyan (C), magenta (M), and yellow (Y), then a colored pixel is formed as the inks adjusted in their densities are ejected onto the recording medium. Also, a pixel which contains black as a component is generally reproduced as a black (K) ink is ejected onto the recording medium.

In recent years, a white ink as well as CMYK inks (hereinafter referred to as "colored inks") has been used so that, for example, a high-quality image in better reproducibility without being bounded by factors of the recording medium such as a color and brightness of the recording medium. Such a use of the white ink is disclosed in Japanese Patent Provisional Publications Nos. HEI7-114241, 2002-38063, 2005-262553, HEI7-110568, 2001-253065, 2002-46303, and 2004-25603 (hereinafter referred to as '241 publication, '063 publication, '553 publication, '568 publication, '065 publication, '303 publication, and '603 publication respectively). According to these techniques, images in higher quality can be achieved by covering a base color of the recording medium with the white ink, and reproducing light colors by adding the white ink to colored inks.

However, according to '241 and '063 publications, printing in the white ink is executed on an entire area or an entire record objective area of the recording medium. Therefore, there has been a problem that an amount of the white ink to be used is increased, therefore it is inefficient for printing speed and print cost.

Further, according to '063, '568, '065, and '303 publications, printing is binary-controlled, and the image is formed based on the control as to whether the white ink is ejected or not on every pixel. However, ejecting the white ink under the binary control cannot reproduce white scales (i.e., gradation) on the recording medium. Therefore, there has been a problem that a pseudo-outline is generated on a border between an area printed in the white ink and an unprinted area, and the image quality is deteriorated. Additionally, when the white ink is ejected onto each pixel, the white ink is ejected uniformly regardless of closeness of the color of the pixels to the base color of the recording medium, thus, the amount of white ink to be used is yet increased.

Furthermore, in the printing apparatuses according to '063, '553, and '065 publications, as to whether the white ink is ejected on each pixel and/or an amount of the white ink to be ejected is determined based on factors such as a color and transparency of the recording medium. However, it is difficult to make an accurate estimate of a color and brightness of each pixel in actual printing of the image by only judging the color and the transparency of the recording medium. Therefore, in order to print a high-quality image using the white ink, a supplier of the printing apparatuses including a manufacturer and a designer has been required to actually execute sample printing on the recording medium and determine a preferable ejecting rate of the white ink (i.e., a white ink level) with respect to each pixel, based on human eye observation.

Furthermore, according to the technique disclosed in '603 publication, an amount of the white ink to be ejected is increased as input levels of the colored inks (CMY) decrease. In this method, if the input levels of the colored inks are high, the amount of the white ink to be ejected decreases, therefore, if the base color of the recording medium is strong, the image quality of printing in the colored inks is deteriorated by the lack of the white ink and the base color of the recording medium affecting the image printed in the colored inks. Thus, similarly to above, it has been difficult to estimate accurately how the color and/or brightness of each pixel in the image as a print output solely by considering the input levels of the colored inks.

SUMMARY

Aspects of the present invention are advantageous in that a print data generating apparatus, an image processing apparatus, a print data generating program, and an image processing program therefor capable of creating print data to print a high-quality image with excellent in reproducibility at high speed yet low cost without being affected by the recording medium, are provided.

BRIEF DESCRIPTION OF THE ACCOMPANYING DRAWINGS

FIG. 7 shows a data configuration of a color conversion table 410 and a white conversion table 420 according to the first embodiment of the invention.

DETAILED DESCRIPTION

General Overview

Figure 1:
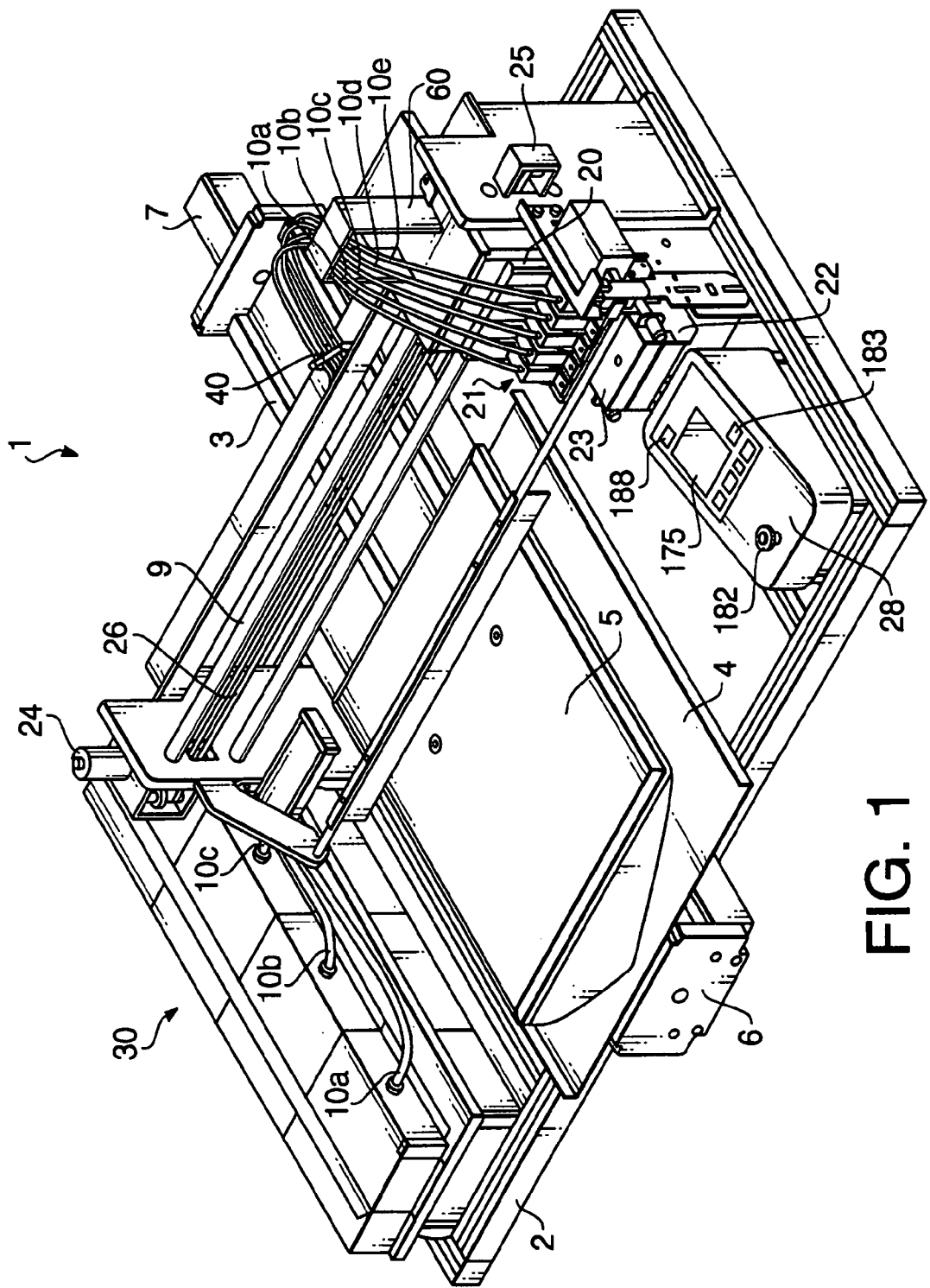
FIG. 1 is a perspective view of an overall configuration of an inkjet printer 1 according to a first embodiment of the invention.

According to an aspect of the present invention, a print data generating apparatus to generate print data which is used for printing in a printing apparatus based on image data is provided. The print data generating apparatus comprises a conversion table storing system, which stores a white conversion table defining a white colorant level corresponding to color information of each of a plurality of pixels that configure the image data, the white colorant level indicating a level of white colorant to be used in the printing apparatus, a colorant data generating system, which generates white colorant data wherein color information of each of the plurality of pixels is converted into the white colorant level according to the white conversion table, and a print data generating system, which generates white print data to be used for printing with the white colorant in the printing apparatus based on the white colorant data.

According to the above configuration, the white colorant data is generated by converting the color information of pixels in the image data into the white colorant level based on the white table, which defines the white colorant level according to the color information of the pixels. The white print data to be used for printing with the white colorant in the printing apparatus is generated based on the white colorant data. Therefore, the print data to print an image with high reproducibility at high speed yet low cost without being affected by the recording medium can be created.

Optionally, the colorant data generating system may convert the color information of the pixels in the image data having one of identical color information and close color information to the color of a recording medium on which the image is formed in the printing apparatus into a lower white colorant level with a lower density of the white colorant than the white colorant level of the pixels in the other areas in the image data.

According to the above configuration, the pixels having color information which is identical or close to the color of the recording medium are lowered in the white colorant level, thus the usage of white material can be preferably adjusted.

Optionally, the white conversion table may define the white colorant level of the pixels in the image data having one of identical color information and close color information to the color of a recording medium on which the image is formed in the printing apparatus to be the lower white colorant level with the lower density than the pixels in the other areas in the image data.

According to the above configuration, the usage amount of white colorant can be preferably adjusted with the print data created by using the white conversion table.

Optionally, the conversion table storing system may store a color conversion table defining a non-white colorant level of each pixel in the image data according to the color information of the pixels in the image data, the non-white colorant level indicating a level of a non-white colorant to be used in the printing apparatus. The colorant data generating system may generate non-white colorant data in which the color information of each of the plurality of pixels in the image data is converted into the non-white colorant level of the non-white colorant based on the color information of each of the plurality of pixels according to the color conversion table. The print data generating system may generate non-white print data to be used for printing with the non-white colorant in the printing apparatus based on the non-white colorant data. The colorant data generating system may convert the color information of the pixels in the image data having one of identical color information and close color information to the color of a recording medium into a lower non-white colorant level with a lower density of the non-white colorant than the non-white colorant level of the pixels in the other areas in the image data.

According to the above configuration, the white print data for printing with the white colorant and the non-white print data for printing in the non-white colorant can be created simultaneously based on the image data. Further, the usage amount of the non-white colorant can be preferably adjusted by converting the pixels having color information identical or close to the color of the recording medium into the lower non-white colorant level.

Optionally, the print data generating system may generate the white print data and the non-white print data in which a printing operation in the printing apparatus is controlled so that the pixels having identical color information to the color of the recording medium are maintained unprinted while the pixels having close color information to the color of the recording medium are printed in the lower level of the non-white colorant level with lower densities of the non-white colorant than the non-white colorant level of the pixels in the other areas in the image data.

According to the above configuration, the usage amounts of the white colorant and the non-white colorant decrease as the color information of the pixels is closer to the color of the recording medium. Therefore, the white scale and non-white color scale (i.e., gradation) can be represented on the recording medium.

Optionally, the conversion table storing system may comprise a plurality of the white conversion tables, each of which corresponds to the recording medium and a table selection system, wherein one of the plurality of the white conversion tables is arbitrarily selected. The colorant data generating system may convert the color information of the pixels in the image data into the white colorant level based on the white conversion table selected in the table selection system.

According to the above configuration, a user can select an optimal white conversion table arbitrarily to create the print data depending on the recording medium, thus an image in high quality and with high reproducibility can be printed on the recording medium.

Optionally, maximum values of the white colorant levels, each of which is defined according to the corresponding recording medium, may vary among the plurality of the white conversion tables.

According to the above configuration, the usage amount of white colorant can be preferably adjusted by limiting the maximum usage of the white colorant depending on the recording medium.

Optionally, the recording medium may be a piece of fabric.

According to the above configuration, the print data generated by the print data generating apparatus can be used when the image is printed on the piece of the fabric in the printing apparatus.

Optionally, the printing apparatus may be an inkjet printer which executes printing by ejecting ink from an inkjet head onto the recording medium.

According to the above configuration, the print data generated by the print data generating apparatus can be used when the image is printed in the inkjet printer as the printing apparatus.

According to another aspect of the present invention, an image processing apparatus which processes image data is provided. The image processing apparatus comprises a conversion table storing system, which stores a white conversion table defining a white colorant level corresponding to color information of each of a plurality of pixels that configure the image data, the white colorant level indicating a level of white colorant to be used in the printing apparatus, a colorant data generating system, which generates white colorant data wherein color information of each of the plurality of pixels is converted into the white colorant level according to the white conversion table, and an image saving system, which applies an imaging process to the white colorant data and saves the processed data as white image data.

According to the above configuration, the white colorant data is generated by converting the color information of pixels in the image data into the white colorant level based on the white table, which defines the white colorant level according to the color information of the pixels. The white print data is applied the imaging process and saved as the white image data. Therefore, the user can visually recognize the image represented by the image data and to be printed with the white colorant based on the white image data.

Optionally, the white image data may be one of 1-channelled image data and 3-channelled image data.

According to the above configuration, the white image data can be saved as 1-channelled image data in a gray scale format or as 3-channelled image data in the RGB format so that the user can arbitrarily edit the white image data.

Optionally, the image processing apparatus may comprise a resolution specifying system, which arbitrarily specifies a resolution of the white image data. The image saving system may convert a resolution of the white colorant data into the resolution specified by the resolution specifying system and saves the white colorant data in the converted resolution as the white image data when the resolution is specified by the resolution specifying system.

According to the above configuration, the resolution of the white image data can be arbitrarily specified by the user and saved so that the user can arbitrarily edit the white image data.

Optionally, the image processing apparatus may comprise an image format specifying system, which arbitrarily specifies an image format of the white image data. The image saving system may convert an image format of the white colorant data into the image format specified by the image format specifying system and saves the white colorant data in the converted image format as the white image data when the image format is specified by the image format specifying system.

According to the above configuration, the image format of the white image data can be arbitrarily specified by the user and saved so that the user can arbitrarily edit the white image data.

According to another aspects of the present invention, a print data generating apparatus is provided. The print data generating apparatus comprises an image processing apparatus to process image data, having a conversion table storing system, which stores a white conversion table defining a white colorant level corresponding to color information of each of a plurality of pixels that configure the image data, the white colorant level indicating a level of white colorant to be used in the printing apparatus, a colorant data generating system, which generates white colorant data wherein color information of each of the plurality of pixels is converted into the white colorant level according to the white conversion table, and an image saving system, which applies an imaging process to the white colorant data and saves the processed data as white image data. The print data generating apparatus generates white print data to be used for printing with the white colorant in the printing apparatus based on the white colorant data.

According to the above configuration of the print data generating apparatus, the image processing apparatus generates white print data to be used for printing with the white colorant based on the white colorant data. Therefore, the user can recognize the image represented by the white image data before executing the image based on the white print data in the printing apparatus.

Optionally, saving the white image data by the image saving system and generating the white print data by the print data generating system may be executed substantially simultaneously based on the white colorant data.

According to the above configuration, the white data can be automatically saved when the corresponding white print data is generated.

Optionally, the print data generating apparatus may comprise a saving specifying system, which specifies as to whether the white image data is to be saved substantially simultaneously while the white print data is generated by the print data generating system.

According to the above configuration, saving the white image data can be arbitrarily executed and canceled when the white print data is generated according to the user's need.

According to another aspect of the present invention, a computer usable medium is provided. The computer usable medium comprises computer readable instructions for controlling a computer to generate print data which is used for printing in a printing apparatus based on image data by executing steps of storing a white conversion table which defines a white colorant level corresponding to color information of each pixel in image data, the white colorant level indicating a level of white colorant to be used in the printing apparatus, generating white colorant data wherein color information of each pixel in the image data is converted into the white colorant level according to the white conversion table, and generating white print data to be used for printing with the white colorant in the printing apparatus based on the white colorant data.

According to the above configuration, the computer can generate the white colorant data converting the color information of pixels in the image data into the white colorant level based on the white table, which defines the white colorant level according to the color information of the pixels. The computer can further generate the white print data to be used for printing with the white colorant in the printing apparatus based on the white colorant data. Therefore, the print data to print the image with high reproducibility at high speed yet low cost without being affected by the recording medium can be created.

According to another aspect of the present invention, a computer usable medium is provided. The computer usable medium comprises computer readable instructions for controlling a computer to process image data by executing steps of storing a white conversion table which defines a white colorant level corresponding to color information of each pixel in image data, the white colorant level indicating a level of white colorant to be used in the printing apparatus, generating white colorant data wherein color information of each pixel in the image data is converted into the white colorant level according to the white conversion table, and saving the white colorant data which is applied an imaging process as white image data.

According to the above configuration, the computer can generate the white colorant data converting the color information of pixels in the image data into the white colorant level based on the white table, which defines the white colorant level according to the color information of the pixels. The computer can further apply the image processing to the white colorant data and save the same as the white image data. Therefore, the user can visually recognize the image represented by the image data and to be printed with the white colorant based on the white image data.

EMBODIMENT

Hereinafter, referring to accompanying drawings, a first embodiment of the present invention will be described. In the present embodiment, a known personal computer 200 (see FIG. 3), which is connected to a known inkjet printer 1 (see FIGS. 1 and 2), generates print data for printing in the inkjet printer 1.

As shown in FIG. 1, the inkjet printer 1 includes a substantially box-shaped chassis 2 with two rails 3 aligned in parallel with a front-rear direction as indicated by an arrow at an approximate center of a bottom surface thereof. The rails 3 are supported by bases (not shown) which are positioned perpendicularly with respect to the bottom surface of the chassis 2. The rails 3 support a plate as a platen base (not shown) which is movable in the front-rear direction of the chassis along the rails 3. Further, the platen base is provided with a platen mount (not shown) that extends perpendicularly with respect to the platen base at a substantial center of the platen base. An exchangeable platen 5 is set on top of the platen mount.

The platen 5 is a substantially rectangular-shaped plate and detachably attached to the platen mount with longer sides thereof aligned in parallel with the front-rear direction of the chassis 2, and clothing fabric as a recording medium is placed on the platen 5. In a position between the platen 5 and the platen base is provided a tray 4, which is fixed to the platen mount, so that a remaining part of the fabric other than the area to be printed such as sleeves of the T-shirt is received thereby and prevented from hanging over the bottom surface of the chassis 2 when the T-shirt is set on the platen 5. A platen drive mechanism 6 includes the rails 3, along which the platen base is carried in the front-rear direction of the chassis 2 by a platen drive motor 7, as the platen motor 7 is provided at a rear end of the platen drive mechanism 6.

At an approximate center of the chassis 2 in the front-rear direction, above the platen 5, a guide rail 9 to guide a carriage 20 with an inkjet head 21 mounted is provided. In vicinity of a left-hand end of the guide rail 9, a carriage motor 24 to drive the carriage 20 is provided, while a pulley 25 is provided in vicinity of a right-hand end of the guide rail 9. Further, a carriage belt 26 is drawn between the carriage motor 24 and the pulley 25 under the guide rail 9. The carriage belt 26 is fixed to a rear surface of the carriage 20 so that the carriage 20 is reciprocated along the guide rail 9 when the carriage motor 24 is activated.

In the inkjet printer 1 according to the present embodiment, white ink, in addition to cyan ink, magenta ink, yellow ink, and black ink, is used for image printing. Therefore, five ink cartridge storage units 30, wherein ink cartridges having the inks therein are detachably attached, are provided on the left-hand side of the inkjet printer 1, and black ink, cyan ink, magenta ink, yellow ink, and white ink are contained in the ink cartridges respectively.

Each ink cartridge storage unit 30 is connected to each of the inkjet heads 21 by ink supplying tubes 10a-10e so that the inks of the five colors stored in the ink cartridges are supplied to each channel of the inkjet heads 21 passing under a guiding member 40 and a tube supporting member 60. The ink supplying tubes 10a-10e are flexible tubes which can be bent and twisted to a certain extent according to the movement of the carriage 20. The guiding member 40 holds the ink supplying tubes 10a-10e behind the carriage 20. The tube supporting member 60 holds the ink supplying tubes 10a-10e as well is provided at an upper surface of the carriage 20.

The carriage 20 is provided with the five piezoelectric inkjet heads 21. Each inkjet head 21 is provided with a plurality of (for example, 128) ejection channels (not shown) through which the ink is conveyed. Each of the channels is provided with a piezoelectric actuator (not shown), which is activated individually, to eject an ink drop downward onto the recording medium from ejection nozzles (not shown) that are open at a nozzle surface of the inkjet head 21. Thus, the inks stored in the ink cartridge storage units 30 are supplied to the inkjet heads 21 through the ink supplying tubes 10a-10e and ejected from the ejection nozzles.

At a position corresponding to the carriage 20 being carried to the right-hand end of the guide rail 9, a purge unit 22 with a suction cap 23, which can be closely attached to and separated from the nozzle surfaces. The purge unit 22 is provided with a suction pump (not shown) so that the inks remaining in the ejection nozzles can be removed therefrom when the suction cap 23 is attached to the nozzle surfaces. Further, when the inkjet printer 1 is not in a printing operation, the nozzle surfaces are covered by the suction cap 23 so that the inks in the nozzle surfaces can be prevented from being dried.

At right-hand front of the chassis 2 is provided an operation panel 28 to which a user inputs an instruction for the inkjet printer 1. The operation panel 28 includes a display 175, a print button 182, a cancel button 183, and a platen feed button 188. As the platen feed button 188 is pressed, the platen 5 is moved to a position wherein the fabric such as a T-shirt as a recording medium can be set on and removed from the platen 5. When the print button 182 is pressed by the user, a printing operation to print the print data received from the personal computer 200 is started. When the cancel button 183 is pressed during the printing operation, the printing operation is canceled.

Figure 2:
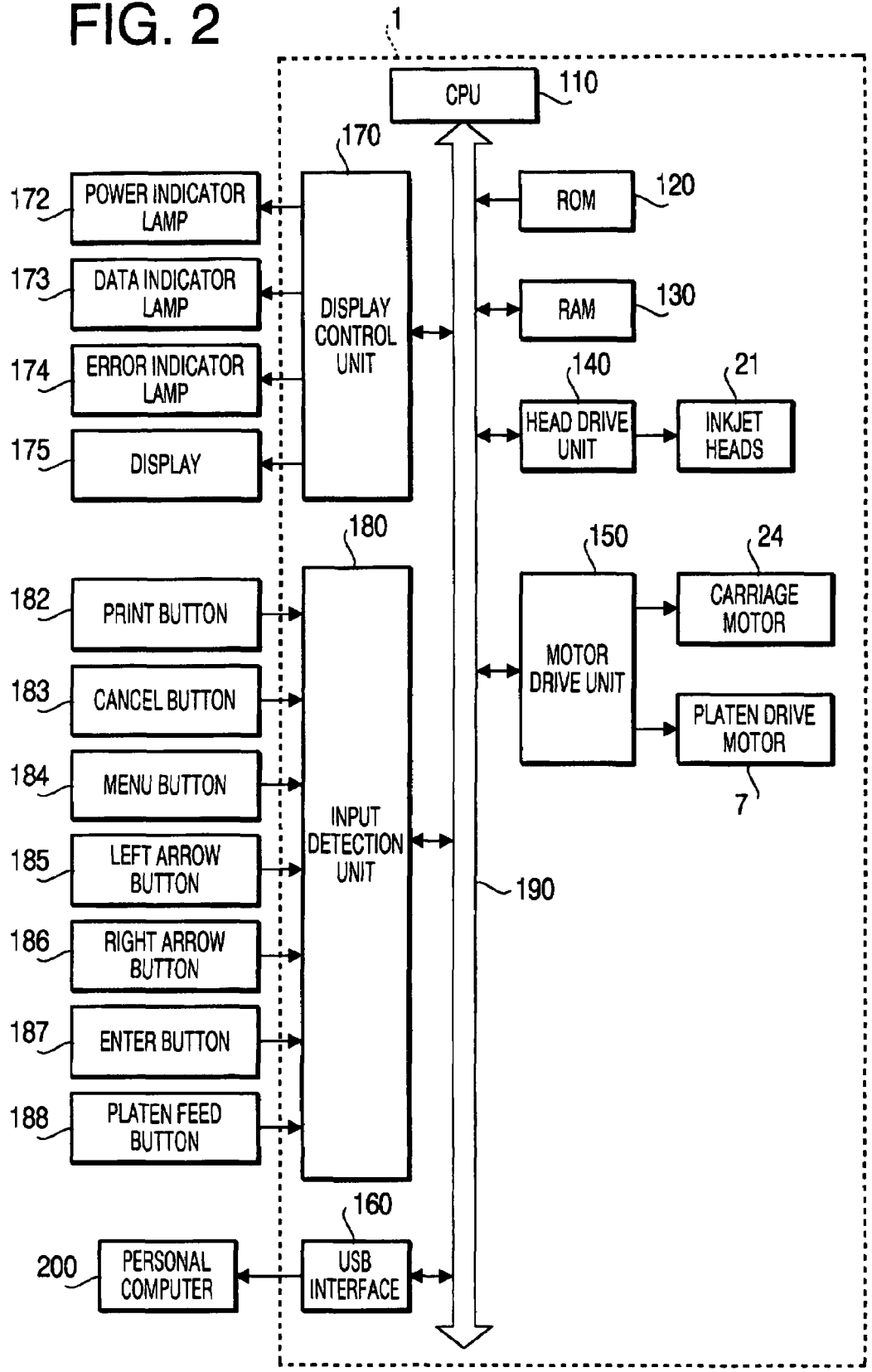
FIG. 2 is a block diagram of an electrical configuration of the inkjet printer 1 according to the first embodiment of the invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 110 that controls the entire operation in the inkjet printer 1. The CPU 110 is connected with a ROM 120, wherein various information to be used in control programs executed by the CPU 110 is stored, and a RAM 130, wherein various information is temporally stored via a bus 190.

The CPU 110 is further connected with a head drive unit 140, which activates the piezoelectric actuators being provided to each channel of the inkjet head 21 and a motor drive unit 150, which controls a carriage motor 24 and a platen drive motor 7. The carriage motor 24 drives the carriage 20 having the inkjet heads 21, and the platen drive motor 7 drives a platen roller (not shown), which adjusts timing and speed to feed the platen 5 holding the fabric as a recording medium. The CPU 110 is further connected to a USB interface 160, which allows communication between the inkjet printer 1 and external devices including the personal computer 200 through a USB cable (not shown).

The operation panel 28 (see FIG. 1) is provided with the display 175, a power indicator lamp 172, a data indicator lamp 173, and an error indicator lamp 174. A display control unit 170 which executes displaying processes of these indicators is connected to the CPU 110 through the bus 190. Further, the operation panel 28 is provided with a menu button 184, a left arrow button 185, a right arrow button 186, and an Enter button 187, in addition to the print button 182, the cancel button 183, and the platen movement button 188 (see FIG. 1). An input detection unit 180 which executes detecting of these inputs is connected to the CPU 110 through the bus 190.

On the display 175, information regarding the print data such as a name and a size of the data being received from the personal computer 200 is displayed as the CPU 110 is in one of various states such as a receiving state, a print ready state, a printing state, and a print completion state, for example. Also, a menu screen (not shown) to prompt the user's input regarding various settings and details of an error when an error occurs, are displayed on the display 175. When the menu button 184 is pressed, the menu screen is displayed on the display 175, and a cursor shown on the display 175 is moved in left and right as the left arrow button 185 and the right arrow button 186 are pressed. Upon pressing the Enter button 187, an item being selected by the cursor is entered.

The ROM 120 in the inkjet printer 1 is provided with several areas including a program storing area for storing programs such as a control program for controlling an operation of the inkjet printer 1 and a print execution program for executing a printing process, and a program-related information storing area for storing information regarding settings, initial values, and data being necessary for executing the programs.

The RAM 130 in the inkjet printer 1 is provided with several areas including a received print data storing area for storing the print data received from the personal computer 200, an in-printing data storing area for storing the print data being printed, and a setting information storing area for storing various setting information.

Figure 3:
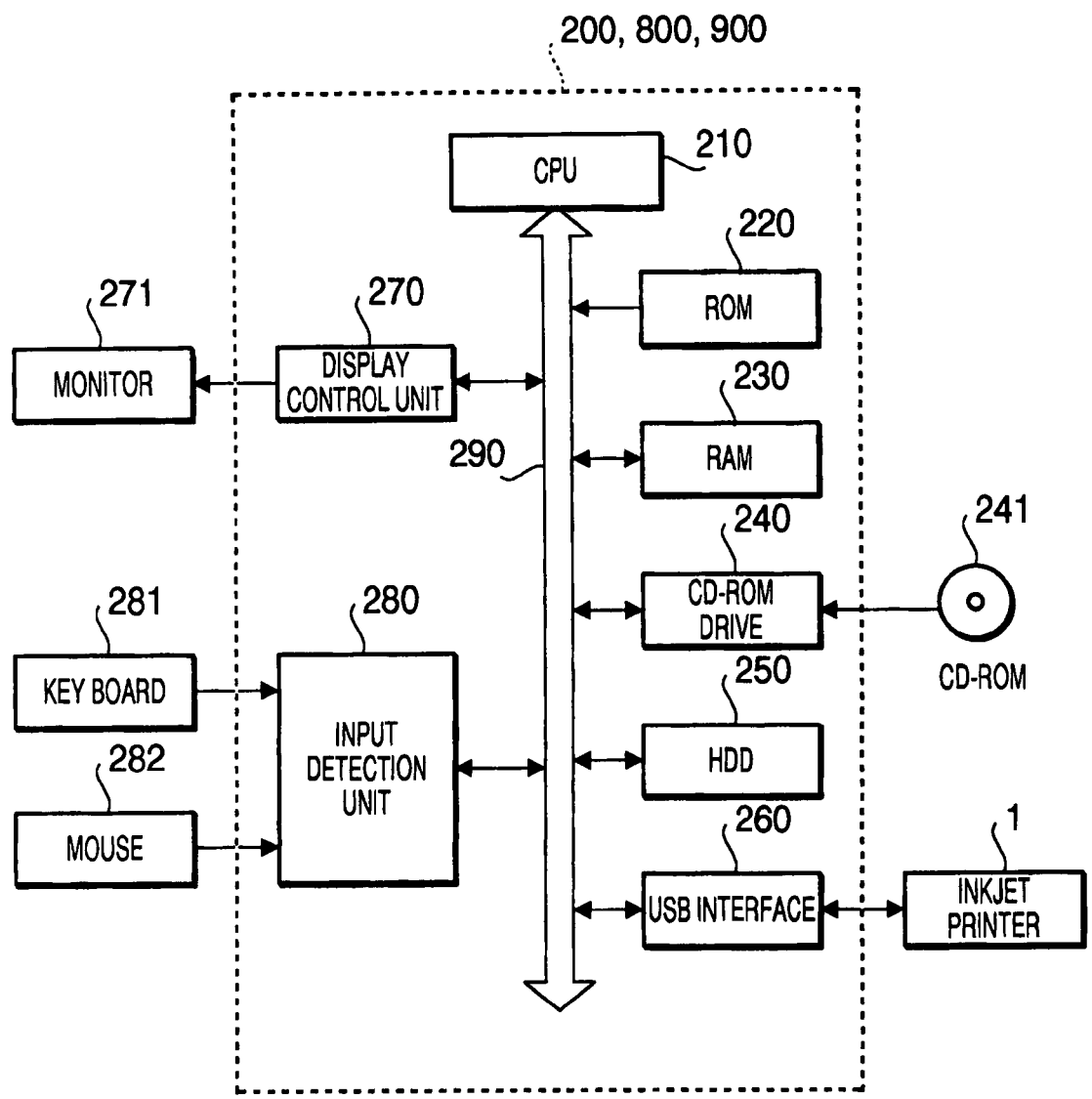
FIG. 3 is a block diagram of an electrical configuration of the personal computer 200 according to the first embodiment of the invention.
Figure 4:
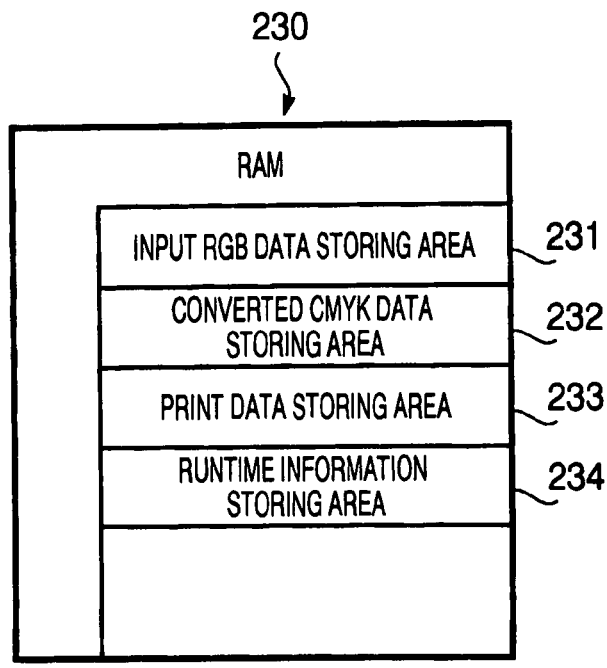
FIG. 4 is a schematic diagram of a RAM 230 in the personal computer 200 according to the first embodiment of the invention.
Figure 5:
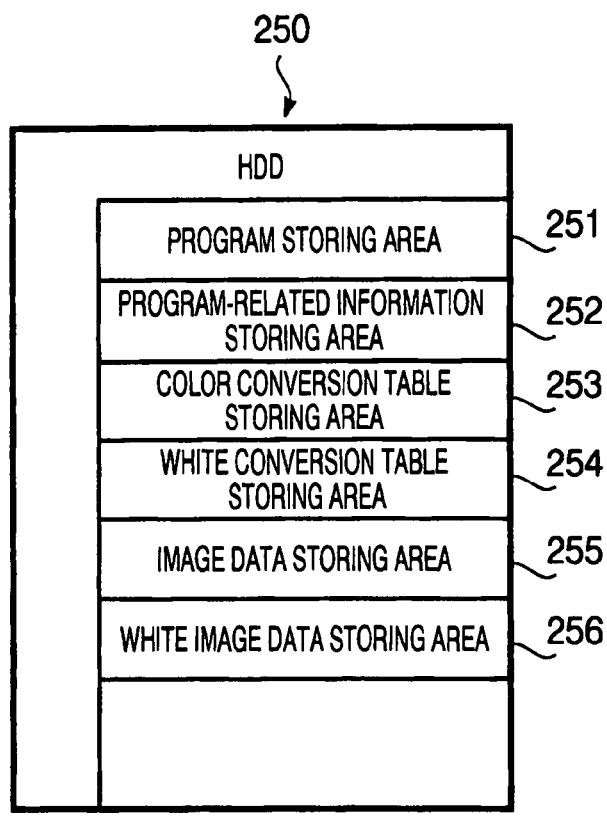
FIG. 5 is a schematic diagram of an HDD (hard disk drive) 250 in the personal computer 200 according to the first embodiment of the invention.

Next, a configuration of the personal computer 200 will be described. FIG. 3 is a block diagram of an electrical configuration of the personal computer 200 according to the present embodiment of the invention. FIG. 4 is a schematic diagram of a RAM 230 in the personal computer 200 according to the present embodiment of the invention. FIG. 5 is a schematic diagram of an HDD 250 in the personal computer 200 according to the present embodiment of the invention. The personal computer 200 is connected to the inkjet printer 1 through a standardized communication cable, for example a USB. In the personal computer 200, print data is generated based on image data created by the user using various applications, and the print data is transmitted to the inkjet printer 1. A process to create the print data will be described in detail hereinafter.

As shown in FIG. 3, the personal computer 200 is provided with a CPU 210 that controls the entire operation in the personal computer 200. The CPU 210 is connected with a ROM 220, wherein various information to be used in controlling programs executed by the CPU 210 is stored, and a RAM 230, wherein various information is temporally stored via a bus 290. Further, a CD-ROM drive 240 for reading data from a CD-ROM 241 inserted therein as a storage medium of data, and the HDD 250 which is a storage unit for data, through a bus 290, are connected to the CPU 210.

The CPU 210 is further connected to a USB interface 260, which allows communication between the personal computer 200 and external devices including the inkjet printer 1 through a USB cable (not shown). The CPU 210 is furthermore connected to a display control unit 270 which executes displaying processes to display an operation screen, input devices including a keyboard 281 and a mouse 282 which are operated by the user, and an input detection unit 280 which executes detecting of these inputs. It should be noted that the personal computer 200 is also provided with other units such as a floppy (registered trademark) disk drive, an audio input-output unit, and various interfaces.

In the CD-ROM 241, printer driver in which a print data creating program is incorporated and information regarding settings and data to be used for executing the program are stored. Such printer driver and the information are stored (copied) from the CD-ROM 241 in a program storing area 251 (see FIG. 5) and a program-related information storing area 252 (see FIG. 5) in the HDD 250, at the time of installation. It should be noted that such information the printer driver for the personal computer 200 and the other information can be obtained in the other method than obtaining from the CD-ROM 241. For example, other recording media such as a flexible disk and an MO (magnet-optical) disk are also available. Further, the information may be obtained from a terminal on a same network by connecting the personal computer 200 to the network.

As shown in FIG. 4, the RAM 230 is provided with several areas including an input RGB data storing area 231 for temporarily storing input RGB data 310 (see FIG. 6), on which image data is based for creating the print data, a converted CMYKW data storing area 232 for storing converted CMYKW data 340 (see FIG. 6), which is converted from the input RGB data 310, a print data storing area 233 for storing print data 350 (see FIG. 6), which is created from the converted CMYKW data 340, and a runtime information storing area 234 for storing temporary the other data to be used during execution of other programs.

Figure 11:
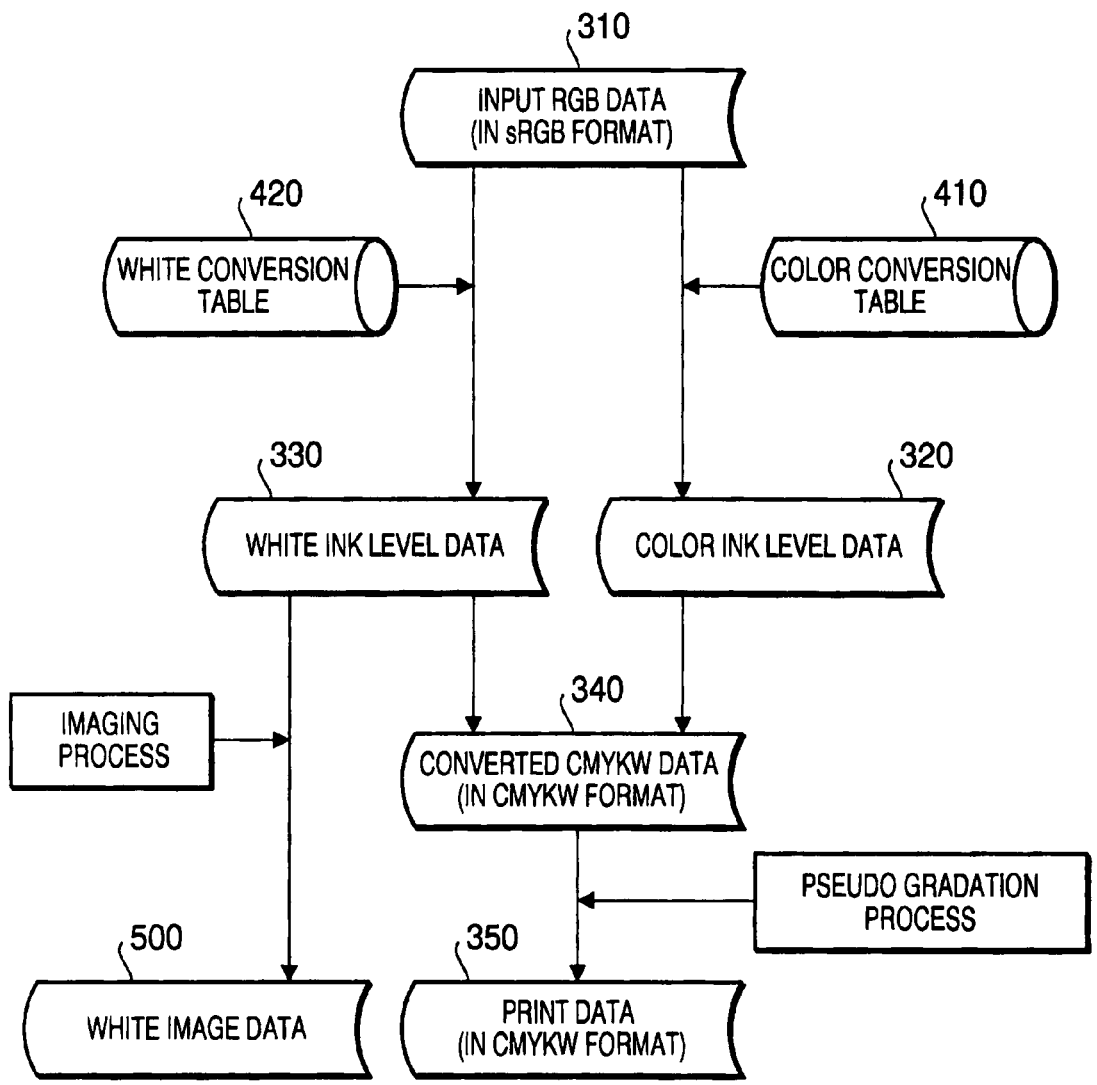
FIG. 11 shows transition of data in a print data generation process according to a third embodiment of the invention.

As shown in FIG. 5, the HDD 250 is provided with several areas including a program storing area 251 for storing various programs to be executed in the personal computer 200 including the printer driver, a program-related information storing area 252 for storing information regarding settings, initial values, and data necessary for executing programs, a color conversion table storing area 253 for storing a color conversion table 410 (see FIG. 6), which is for converting the input RGB data 310 into a CMYK format, a white conversion table storing area 254 for storing a white conversion table 420 (see FIG. 6), which is for converting the input RGB data 310 into a W format, an image data storing area 255 for storing image data, and a white image data storing area 256 for storing white image data 500 (see FIG. 11).

In the color conversion table storing area 253, a plurality of color conversion tables 410, each of which corresponds to a feature of an image to be printed by the inkjet printer 1 such as a color and a material of the recording medium used, are stored. Similarly, in the white conversion table storing area 254, a plurality of white conversion tables 420, each of which corresponds to a recording medium to be used by the inkjet printer 1 are stored. In this regard, values in the plurality of color conversion tables 410 and the values in the plurality of white conversion tables 420 respectively correspond on one-to-one basis according to the feature (see FIG. 7).

With the aforementioned configuration of the inkjet printer 1 according to the embodiment, as the print data transmitted from the personal computer 200 is received, the user sets a T-shirt on the platen 5 and presses the print button 182.

Accordingly, the platen 5 is moved to rearward of the chassis 2 along the rails 3 by the platen driving motor 7 so that the position of the carriage 20 with respect to the platen 5 corresponds to a recording start position. Thereafter, the inkjet heads 21 eject the inks as the carriage 20 is moved from the right-hand side to the left-hand side of the chassis 2 according to a recording instruction so that recording of one line is executed. Further, the platen 5 is moved to frontward from the rearward of the chassis 2 for an amount corresponding to one line, and the inkjet heads 21 eject the inks as the carriage 20 is moved from the right-hand side to the left-hand side of the chassis 2 according to the recording instruction so that recording of the next line is executed. Subsequently, the platen 5 is moved to frontward from the rearward of the chassis 2 for the amount corresponding to another one line portion. By repeating this operation, printing the image onto the T-shirt is executed. At the end of the printing operation, the platen 5 is fed forth to a position wherein the T-shirt can be removed, thus the user removes the T-shirt which underwent the printing operation.

Hereinafter, color reproduction in the personal computer 200 and the inkjet printer 1 will be described. When a color in an area is displayed on the monitor 271 in the personal computer 200, the color of pixels configuring the area is represented in a format called sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

When an image is printed in a printing apparatus such as the inkjet printer 1 by ejecting the inks, a color is reproduced in a format called CMYK format, which is a method of representing colors by using four colors, which are the three primary colors (cyan, magenta, and yellow) and black, and the color is reproduced by a combination of the four values that are C value, M value, Y value, and K value. In order to print the print data represented in this format, inks in the four colors are used in the inkjet printer 1 wherein an ejecting amount of the cyan ink is determined by the C value, an ejecting amount of the magenta ink is determined by the M value, an ejecting amount of the yellow ink is determined by the Y value, and an ejecting amount of the black ink is determined by the K value.

In addition to the four inks, in the present embodiment, even when a base color of the recording medium such as a T-shirt is other than white (e.g. black and blue), in order to suitably print an image in higher reproducibility on a material surface of the recording medium, white ink is used. In this regard, an ejecting amount of the white ink is determined by a W value. Specifically, the color is reproduced in five values of the print data that are the C value, the M value, the Y value, the K value, and the W value, and image printing is executed by using the inks in these five colors.

Thus, in order to print the image based on the image data being displayed on the monitor 271 of the personal computer 200 by the inkjet printer 1, it is required to convert the image data in the sRGB format into print data in the CMYKW format. According to the present embodiment, upon executing a print data generation process (FIG. 8) by the personal computer 200, the print data in the CMYKW format is created based on the image data in sRGB format.

Figure 6:
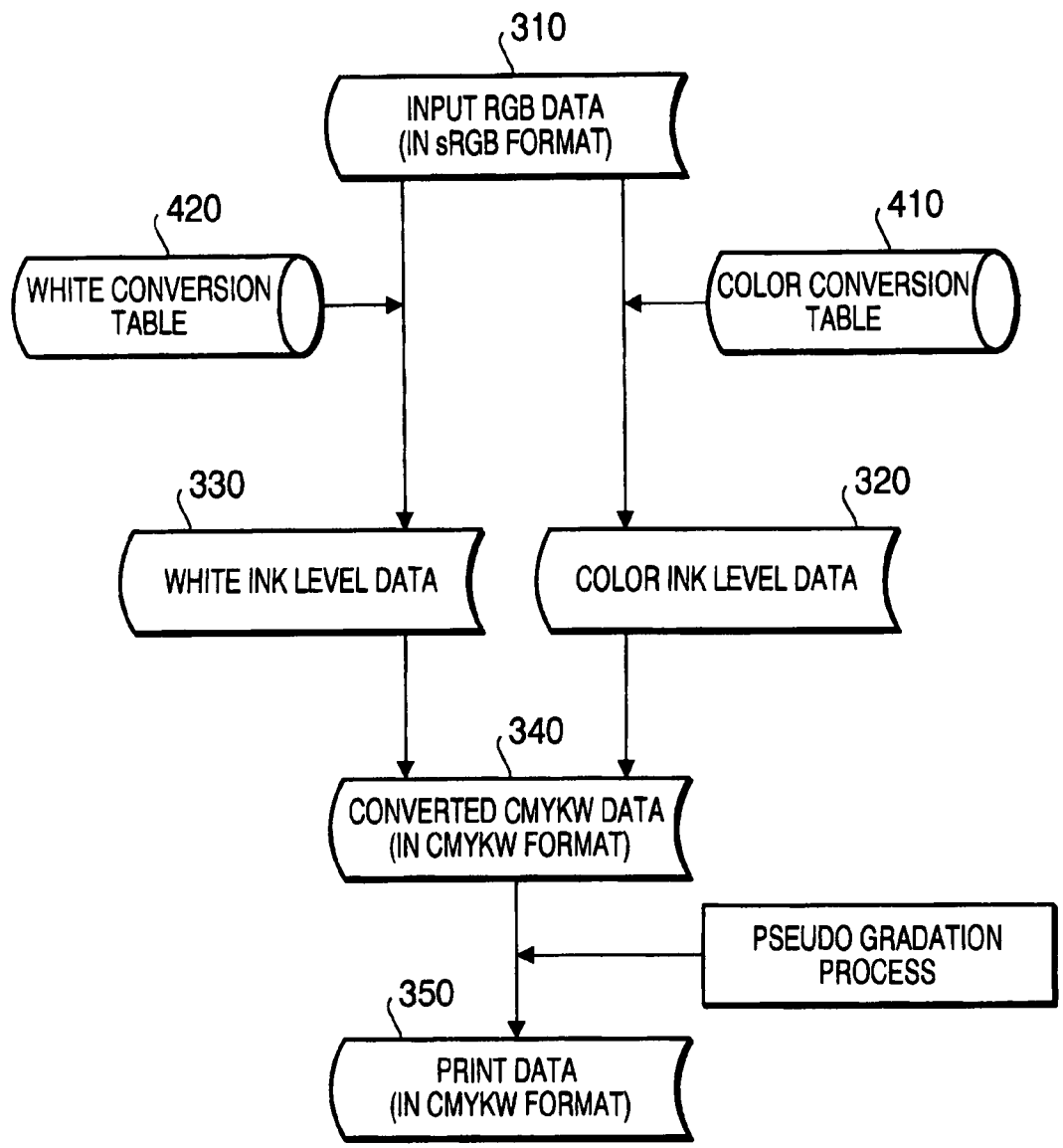
FIG. 6 shows transition of data in a print data generation process according to the first embodiment of the invention.

Hereinafter, the data to be generated in the print data generation process according to the present embodiment will be described. FIG. 6 shows transition of data in the print data generation process according to the embodiment of the invention. FIG. 7 shows a data configuration of the color conversion table 410 and the white conversion table 420 according to the embodiment of the invention. As shown in FIG. 6, basic data to create print data 350 is the input RGB data 310 in the sRGB format stored in the input RGB data storing area 231 in the RAM 230. The input RGB data 310 is the data which is specified to be printed by the user among a plurality of pieces of image data which have been created by the user using various applications such as an application designed for creating documents and an application designed for editing graphics. Thus, the input RGB data 310 is saved in the image data storing area 255 of the HDD 250. Specifically, the image data according to the present embodiment is represented in 256 color scale of the image data in sRGB format. The color conversion table 410 and the white conversion table 420 respectively define color conversion values which include five steps for each of R values, G values, and B values (i.e., 125 combinations of the sRGB values in total).

The color ink level data 320 in the CMYK format is created in a process such that the sRGB values of each pixel which composes the input RGB data 310 are respectively converted into the CMYK values based on the color conversion table 410, which is stored in the color conversion table storing area 253 of the HDD 250. The color conversion table 410 is a table for converting the input data in 256 color scale in the sRGB format into the output data in 256 color scale in the CMYK format. As shown in FIG. 7, each of the CMYK values is defined to correspond to each of the sRGB values respectively. Further, the sRGB values of each pixel which composes the input RGB data 310 are converted into the corresponding CMYK values respectively based on the color conversion table 410. In this regard, since the color conversion table 410 has a five-step configuration, the CMYK values corresponding to the sRGB values between each step are obtained by a known volume interpolation formula.

Also, the white ink level data 330 in W format is created in a process such that the sRGB values of each pixel which composes the input RGB data 310 are converted into the W values respectively based on the white conversion table 420 stored in the white conversion table storing area 254 of the HDD 250. The white conversion table 420 is a table for converting the input data in 256 color scale in the sRGB format into the output data in 256 color scale in W format. As shown in FIG. 7, the W value is defined to correspond to each of the sRGB values respectively. Further, the sRGB values of each pixel which composes the input RGB data 310 are converted into the corresponding W value respectively based on the white conversion table 420. In this regard, since the white conversion table 420 has a five-step configuration, the W value corresponding to the sRGB values between each step is obtained by a known volume interpolation formula.

Thus, the sRGB values of each pixel which composes the input RGB data 310 are converted into the CMYKW values respectively based on the color conversion table 410 and the white conversion table 420. Further, the converted CMYKW data 340 in 256 color scale in the CMYKW format configured with the color ink level data 320 and the white ink level data 330 is stored in the converted CMYKW data storing area 232 of the RAM 230. Additionally, a pseudo gradation process is performed on the converted CMYKW data 340 so that the print data 350 in 2 color scale in the CMYKW format is created and stored in the print data storing area 233 in the RAM 230. Lastly, the print data 350 is transmitted to the inkjet printer 1 so as to be used for the image printing on the T-shirt as a recording medium.

Figure 8:
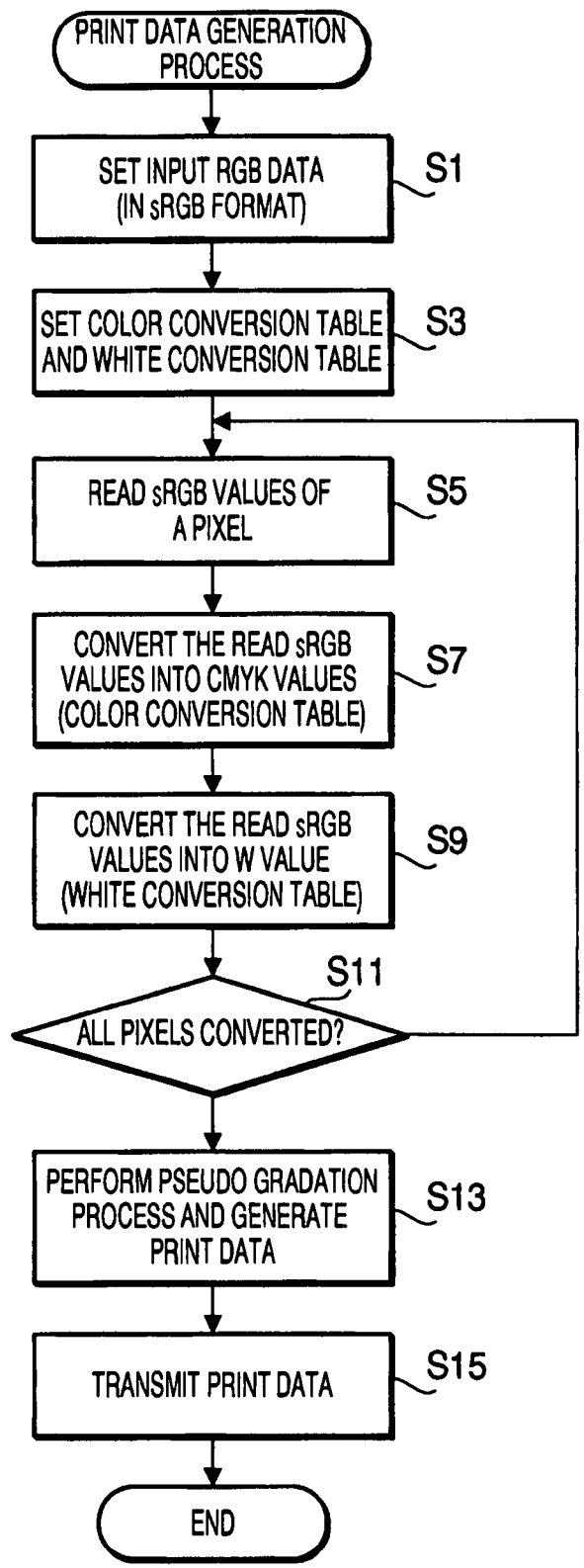
FIG. 8 is a flowchart of a print data generation process according to the first embodiment of the invention.

Hereinafter, a print data generation process to be executed in the personal computer 200 for achieving the aforementioned data conversion will be described. FIG. 8 is a flowchart of the print data generation process according to the embodiment of the invention. According to the present embodiment, when the user instructs to execute printing of the image data, the printer driver is activated. And the print data generation process is executed by the CPU 210 based on a print data creating program incorporated in the printer driver.

As shown in FIG. 8, in the print data generation process according to the present embodiment, first, the image data is set as the input RGB data 310 (S1). In S1, the image data which is specified to be printed by the user among the plurality of pieces of image data stored in the image data storing area 255 is read into the input RGB data storing area 231 as the input RGB data 310.

Further, the color conversion table 410 and the white conversion table 420 which are used for data conversion of the image data are set (S3). In S3, according to the feature such as a color and a material of the recording medium specified by the user, an optimal color conversion table 410 is read from the color conversion table storing area 253, and an optimal white conversion table 420 is read from the white conversion table storing area 254. Alternatively, the color conversion table 410 and the white conversion table 420 which are set in S3 may be arbitrarily specified by the user with using the keyboard 281 and the mouse 282.

Thereafter, the sRGB values for a first pixel which composes the input RGB data 310 set in S1 are read (S5), and the sRGB values read in S5 are converted into the corresponding CMYK values based on the color conversion table 410 set in S3 (S7). Further, the sRGB values read in S5 are converted into the corresponding W value, based on the white conversion table 420 set in S3 (S9).

In case of the color conversion table 410 shown in FIG. 7, for example, when the sRGB values (i.e., 64, 192, 255) are read in S5, the CMYK values (i.e., 190, 21, 0, 0) are obtained in S7, and the W value (i.e., 251) is obtained in S9. Thereafter, the CMYKW values (i.e., 190, 21, 0, 0, 251) obtained in S7 and S9 are stored in a relevant pixel number field in the converted CMYKW data storing area 232.

Next, it is judged as to whether all the pixels which compose the input RGB data 310 set in S1 are converted (S11). If not (S11: NO), the process returns to S5, wherein the sRGB values for a next pixel are read, and the sRGB values of the pixel are converted into the CMYKW values (S7-S9). In this manner, the steps from S5 to S11 are executed repeatedly until data conversion of all the pixels which compose the input RGB data 310 are executed. Therefore, in the converted CMYKW data storing area 232, the color ink level data 320 in 256 color scale in the CMYK format and the white ink level data 330 in 256 color scale in the W format converted based on the input RGB data 310 in 256 color scale in the sRGB format are stored. Thus, the converted CMYKW data 340 in 256 color scale in the CMYKW format is configured with the color ink level data 320 and the white ink level data 330.

In S11, if all the pixels are converted (S11: YES), the converted CMYKW data 340 stored in the converted CMYKW data storing area 232 is converted into the print data 350 in 2 color scale in the CMYKW format by a pseudo gradation process (S13). The pseudo gradation process is for binarizing the converted CMYKW data 340 in 256 color scale to down scaled print tone, and the pseudo gradation process is performed by an error diffusion method in the present embodiment. And the print data 350 created in S13 is stored in the print data storing area 233. Thereafter, the print data 350 stored in the print data storing area 233 is transmitted to the inkjet printer 1 (S15), and the process is terminated.

Meanwhile, in the inkjet printer 1 of the present embodiment, upon receiving the print data 350 transmitted from the personal computer 200, the print data 350 is stored in the received print data storing area (not shown) of the RAM 130. When the user presses the print button 182, the print data 350 is read in the in-printing data storing area (not shown), and image printing is executed on the T-shirt as a recording medium based on the print data 350.

In the present embodiment, the five the inkjet heads 21 are arranged in an order of cyan (C), magenta (M), yellow (Y), K (black), and W (white) in a direction from left to right (see FIG. 1). In a one-way printing in the printing operation, the inks are ejected in the order of W, K, Y, M, and C from left to right onto the fabric. Thus, the white ink is ejected onto the fabric ahead of the other four colors of inks (CMYK). As a result, ground color of the fabric such as T-shirt can be covered with the white ink before the image is formed by the colored inks (CMYK) so that the image can be printed in fine reproducibility even if the ground color of the fabric is in a color other than white.

In the present invention, a color conversion table 410 which defines optimal CMYK values corresponding to the sRGB values and a white conversion table 420 which defines an optimal W value corresponding to the sRGB values are provided according to the recording medium (in the present embodiment, a T-shirt with the ground color of blue) by a supplier including a manufacturer and a designer of the inkjet printer 1 so that the print data 350 that enables an image which appearing on the monitor 271 to be printed in high reproducibility on the recording medium by using the white ink and the other colored inks regardless of the features including a color and a material of the recording medium can be generated.

Hereinafter, a method to create the color conversion table 410 and the white conversion table 420 will be described. In the present embodiment, a method to create a color conversion table 410 which defines optimal CMYK values corresponding to the sRGB values of the input pixels and a white conversion table 420 which defines an optimal W value corresponding to the sRGB values of the input pixels, based on the five steps for each of R values, G values, and B values (i.e., 125 RGB values in total) respectively, is explained as an example. Optionally, the following table creating operation may be executed in a computer other than the personal computer 200.

First, the supplier converts the aforementioned 125 RGB values into the corresponding CMYK values respectively. Although there are known methods such as GCR and UCR to convert the RGB values into the CMYK values, a case of conversion using the following calculation 1 is explained as an example. In this calculation 1, each value subtracted from the maximum level "255" by R value, G value, and B value is defined as C value, M value, and Y value respectively, and the minimum value among these C value, M value, and Y value is defined as K value, i.e., C=255-RM=255-BY=255-GK=Min (C, M, Y). Further, each value subtracted from the above-described C value, M value, and Y value respectively by the above-described K value is defined as C value, M value, and Y value, i.e., C=C-KM=M-KY=Y-K. Furthermore, a process based on the above-described calculation 1 is executed also on the remaining RGB values, thus a total of 125 CMYK values corresponding to the 125 RGB values are obtained.

Next, the white ink level (i.e., the W value), which is an optimal base layer to be printed, is obtained respectively according to the 125 CMYK values obtained from the above-described calculation 1. In this operation to obtain the white ink level, the supplier determines the optimal W value to each of the CMYK values by a trial-and-error method based on the supplier's own experiences and past experiments. Thus, because an actual printed color appears still different from the color displayed on the monitor 271 depending on the feature of the recording medium such as a color and a material, even if the color is printed based on same CMYKW values. Therefore, the optimal W value to the CMYK values is determined so that the color printed on a blue T-shirt based on the CMYK values and the color of the RGB values corresponding to the CMYK values are matched. Thus, a total of 125 W values which respectively correspond to the CMYK values are obtained by executing the above-described operation on all of the 125 CMYK values.

In this regard, it should be noted that the W value determined by the supplier corresponding to each CMYK value is arbitrarily determined. In the present embodiment, an RGB value closer to the ground color of the fabric (i.e., blue in the present embodiment) is set to have a lower level of W value so that density of the white ink is lower than the other RGB values. Therefore, the CMYK values being closer to the blue is determined to be a smaller W value, while the W value to the CMYK values being identical to the blue is determined to be "0".

Subsequently, actual sampling print in the aforementioned 125 CMYK values is executed on the blue T-shirt. Then, the 125 colors printed on the T-shirt are measured so that 123 L*a*b* values corresponding to each printed color is obtained. Thus, the L*a*b* values which respectively correspond to the 125 RGB values are obtained.

According to the above method, a table (output profile) for converting the RGB values to the L*a*b* values is obtained. Thereafter, by merging the profile which defines the sRGB (i.e., input profile) and the output profile, a profile for converting the sRGB values into the RGB values is created. This type of profile for converting the input color space directly into the output color space is referred to as "device link profile".

In this regard, it should be noted that the above-described calculation 1 is for converting the RGB values into the CMYK values. Therefore, as the sRGB values are converted into the RGB values and applied with the calculation 1, the corresponding CMYK values are obtained. Therefore, by defining each of the values converted from the sRGB values to the CMYK values (i.e., correspondence of the sRGB values and the CMYK values) as a profile, the color conversion table 410 is created.

Meanwhile, as described above, the supplier converts the RGB values into the W value arbitrarily. Therefore, the sRGB values can be converted into the W values by determining the optimal W values after the sRGB values are converted into the RGB values. Thus, by defining each of the values converted from the sRGB values to the W value (i.e., correspondence of the sRGB values and a W value) as a profile, the white conversion table 420 is created.

In the present embodiment, a plurality of color conversion tables 410 and a plurality of white conversion tables 420 are created according to the features of the recording medium in the aforementioned table creating method, and the created tables are stored in the color conversion table storing area 253 and the white conversion table storing area 254 respectively. However, the plurality of white conversion tables 420 are different in the maximum level of the white ink level (i.e., the W value) depending on the features of the recording medium. In other words, the supplier has set the W values for each color conversion table 410 so as not to exceed the predetermined maximum value according to the recording medium. For example, when the printing is performed on fabric as a recording medium, the maximum level of the W value is "255" since an effect of using the white ink may not be obtained with a small amount, while, when the printing is performed on paper as a recording medium, the maximum level of the W value is "125" as the effect of using the white ink may be obtained more easily with the small amount of white ink.

The color conversion tables 410 and the white conversion tables 420 created as described above define the optimal CMYK values corresponding to the sRGB values and the optimal W value corresponding to the sRGB values respectively for the recording medium being use (i.e., the blue T-shirt in the present embodiment). Therefore, in the print data generation process (see FIG. 8), the converted CMYKW data 340, wherein each pixel configuring the input RGB data 310 in the sRGB format is converted into the optimal CMYK values and the optimal W value, is created. Thus, an image in higher reproducibility is printed, even the ground color of the fabric is other than white, as the printing is performed based on the print data 350.

Moreover, it should be noted that the W values defined in the white conversion tables 420 are determined to be the optimal values considering various conditions including correlation between the recording medium and the colored inks by the supplier based on the supplier's own experiences and past experiments. Therefore, the image is printed with the optimal amount of inks based on the print data 350 so that an image with higher reproducibility can be achieved at high speed yet low cost.

Further, according to the present embodiment, the plurality of color conversion tables 410 and the plurality of white conversion tables 420 are created according to the feature of the recording medium in advance, and are stored in the color conversion table storing area 253 and the white conversion table storing area 254 respectively. Therefore, the print data 350 can be created by selecting the optimal color conversion table 410 and the optimal white conversion table 420, even when the recording medium to be printed by the inkjet printer 1 is changed. Furthermore, by limiting the maximum usage of the white ink depending on the recording medium, the usage of white ink is optimally adjustable.

As thus far described, in the personal computer 200 according to the present embodiment, a plurality of input pixels which compose the input RGB data 310 are converted into the color ink level data 320, which is further converted into the CMYK values corresponding to the respective sRGB values and the white ink level data 330, which is further converted into the W value corresponding to the respective sRGB values, based on the color conversion table 410, which is defined by the CMYK values corresponding to the sRGB values, and the white conversion table 420, which is defined by the W value corresponding to the sRGB values. Then, the print data 350 which is used for printing in the colored inks (CMYK) and in the white ink (W) in the inkjet printer 1 is created based on the converted CMYKW data 340 which consists of the color ink level data 320 and the white ink level data 330. Thus, the print data 350 to print the image being with higher reproducibility at high speed yet low cost without being affected by the feature of the recording medium, can be created.

Furthermore, in the present embodiment, the white conversion table 420 defines the lower level of W value corresponding to the RGB values identical or proximate to the ground color (i.e., blue) of the fabric as a recording medium. According to the white conversion table 420, the pixels having the sRGB values which are identical or close to the ground color of the T-shirt among a plurality of input pixels of the input RGB data 310 are converted into the low level W values. Thus, the input pixels having the sRGB values being identical or proximate to the blue color of the T-shirt are set in the low W values so that the usage of white ink at the time of image printing can be optimally adjusted.

Moreover, the plurality of color conversion tables 410 and the plurality of white conversion tables 420 are provided according to the feature of the recording medium in advance, so that the optimal color conversion table 410 and the optimal white conversion table 420 are selectable to be used for creating the print data 350. Furthermore, each of the plurality of white conversion tables 420 is provided with different maximum values of the white ink level (i.e., the W value) respectively depending on the recording medium. Thus, printing an image with higher quality can be achieved even when the recording medium to be printed is changed, and the usage amount of the white ink is optimally adjustable by limiting the maximum usage amount of the white ink.

Next, referring to FIGS. 9 and 10, a second embodiment of the present invention will be described. A personal computer 800 (see FIG. 3) according to the present embodiment is generally similar to the personal computer 200 in the previous embodiment, except a method to create the color conversion table 410 and the white conversion table 420. In the second embodiment, a configuration of the personal computer 800 which is similar to the configuration of the previous embodiment is referred to by an identical reference numeral, and description of that will be omitted.

It should be noted that, in the first embodiment, the supplier sets a smaller W value to the sRGB values which are close to the color of the recording medium so as to create the white conversion table 420 by a trial-and-error method. Meanwhile, according to the second embodiment, a smaller W value is set automatically by a computer to the sRGB values which are similar to the color of the recording medium to create the white conversion table 420. In addition, smaller CMYK values are set automatically by the computer to the sRGB values which are similar to the color of the recording medium to create the color conversion table 410. Hereinafter, a configuration of the second embodiment being different from the first embodiment will be described. In this regard, it is assumed that the recording medium is a T-shirt having the ground color of blue.

First, similarly to the first embodiment, each color conversion value based on the five steps for each of R values, G values, and B values (i.e., 125 RGB values in total) respectively is obtained, and a color conversion table 410 which defines the optimal CMYK values and a white conversion table 420 which defines the optimal W value are created. It should be noted that, when the supplier obtains each white ink level (i.e., the W value) which corresponds to each of the CMYK values, the maximum level of the W value to each of the CMYK values to be uniformly determined is defined to be "255".

As described in the first embodiment, correlation of the 125 W values (however, uniformly "255" in the present embodiment) corresponding to the 125 RGB values are defined in the process of the aforementioned table creating method. Accordingly, a conversion table X for converting the RGB values into the W value based on the correlation is created. Further, a device link profile which is for converting the sRGB values into the RGB values as described in the first embodiment is defined to be a conversion table Y.

Next, the sRGB values corresponding to the ground color of the recording medium is obtained. Particularly, the sRGB values equivalent to the ground color of the T-shirt are determined. The sRGB values may be determined based on the supplier's own experiences arbitrarily or may be determined by obtaining sRGB values corresponding to the L*a*b* values which are obtained by measuring the actual color of the T-shirt. Next, the RGB values corresponding to the sRGB values of the ground color are obtained by referring to the conversion table Y. In this regard, it is assumed that the ground color of the T-shirt is already determined to be the sRGB values (0, 0, 255), and the RGB values (0, 0, 255) corresponding to the sRGB values (0, 0, 255) are obtained based on the conversion table Y.

Hereinafter, a data processing method to create the white conversion table 420 based on the conversion table X and the RGB values of the ground color will be explained. In the white conversion table 420, as the sRGB values of the input pixels are closer to the ground color of the recording medium, the W values corresponding to the sRGB values become smaller, FIG. 9 is a flowchart of a white ink level adjustment process according to the second embodiment of the invention. Optionally, the white ink level adjustment process may be also executed by a computer other than the personal computer 800.

Figure 9:
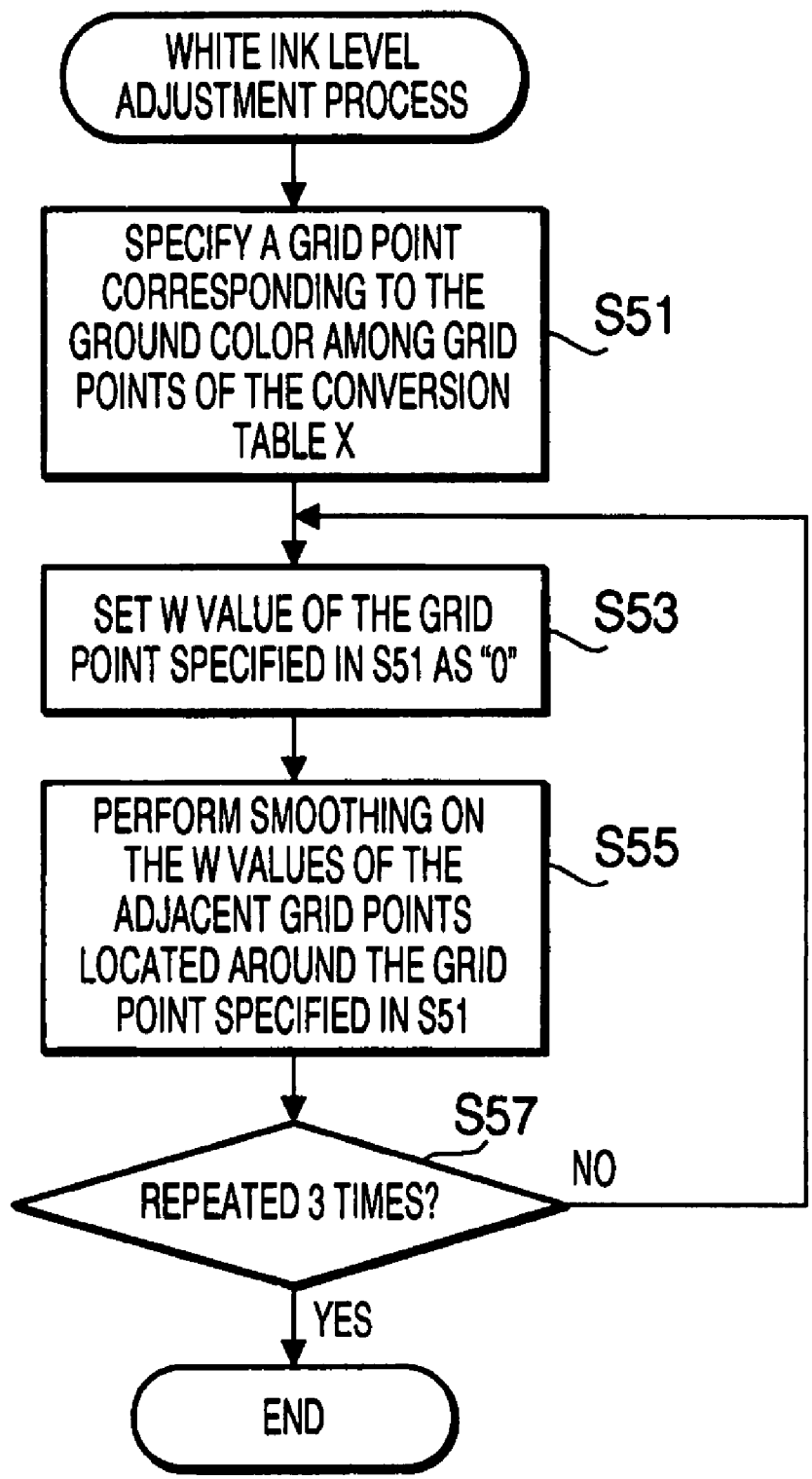
FIG. 9 is a flowchart of a white ink level adjustment process according to a second embodiment of the invention.

As shown in FIG. 9, in the white ink level adjustment process, first, when the supplier inputs the RGB values of the ground color, a grid point corresponding to the RGB values of the ground color is specified among the grid points in the conversion table X (S51). In the conversion table X, grid points of the five steps of R values, G values, and B values (total 125 values) are provided in the three-dimensional RGB color space. Therefore, when the RGB values of the ground color are located on any one of the 125 grid points, the grid point is specified. Further, when the RGB values of the ground color are located on a straight line including two grid points, the two grid points are specified. Furthermore, when the RGB values of the ground color are located on a plane including four grid points, the four grid points are specified. In other cases, eight grid points which form a minimum volume including the grid point location of the RGB values of the ground color are specified. In the present embodiment, as the RGB values of the ground color are (0, 0, 255) being located on a grid point (0, 0, 255) in the RGB color space of the conversion table X, this one grid point is specified.

Next, the W value corresponding to the grid point specified in S51 is set to be the minimum level "0" (S53). This means, all the W values corresponding to the grid points specified in the step S51 are set to be "0" in S53, while the W value ("255" in the present embodiment) is set correspondingly to the grid points of the 125 sRGB values respectively in the conversion table X. As a result, if there is one grid point specified in S51, the corresponding one W value is set to be "0". Further, if there are eight grid points specified in S51, the corresponding eight W values are all set to be "0". According to the present embodiment, in the conversion table X, the W value corresponding to the grid point (0, 0, 255) specified in S51 is set to be "0".

Next, smoothing is performed on the W values of the grid points located around the grid point specified in S51 (S55). Specifically, in the conversion table X, distances from the grid point specified in S51 to each of all the 125 grid points are obtained by a formula 1 described below.

$$L=\sqrt{(R1-R2)^2+(G1-G2)^2+(B1-B2)^2} \quad \text{[Formula 1]}$$

Subsequently, when a distance between one of the grid points is equal to or less than the predetermined threshold ("200" in the present embodiment), the W value corresponding to the grid point is smoothed. The smoothing is achieved by obtaining an average of the W value as a targeted grid point and the W values of the grid points located on the minimum distance from the aforementioned targeted grid point (i.e., a plurality of adjacent grid points), and the average W value is set to be the W value of the grid point to be the smoothing target. In the present embodiment, smoothing is performed on the grid point (0, 0, 255) specified in S51 and the adjacent grid points located in a distance which is equal to or less than the threshold so that the averaged W value is set to be the W value of these grid points.

It should be noted that, when a plurality of grid points are specified in S51, distances between the plurality of grid points and a specified grid pint are obtained. Thereafter, it is judged as to whether the minimum distance among the obtained distances is equal to or less than the predetermined threshold. If the minimum distance is less than or equal to the predetermined threshold, the W value of the specified grid point is smoothed. The process on the specified grid point is performed on all the 125 grid points.

Subsequently, it is judged as to whether the steps from S53 to S55 have been repeated for three times (S57). If not, (S57: NO), the process returns to S53. Thereafter, the W value corresponding to the grid point specified in S51 is set to be the minimum level "0" again (S55), and smoothing is performed on the W values around the grid point of which W value was set to be "0" in S53 (S57). If above process has been repeated for three times (S57: YES), the white ink level adjustment process is terminated.

According to the above-described white ink level adjustment process, in the conversion table X, the W values ("255" in the present embodiment) corresponding to the RGB values of the ground color and the adjacent RGB values are updated to be the lower white ink level. Specifically, the W values corresponding to the RGB values of the ground color is set to be the minimum level "0", and as the distance from the RGB values of the ground color on the RGB color space becomes greater, the W values corresponding to the respective adjacent RGB values become greater. In other words, definitions of the conversion table X are updated so that the closer values between the RGB values of the input pixel and the RGB values of the ground color become the smaller W values corresponding to the input pixel.

Next, the previously created color conversion table 410 and the white conversion table 420 are re-created based on the conversion table X after execution of the white ink level adjustment process. Specifically, similarly to the first embodiment, sample printing and color measurement are executed on the aforementioned 125 CMYKW values which correspond to the conversion table X so that the input profile and the output profile are obtained. Thereafter the color conversion table 410 and the white conversion table 420 are created based on the input profile and the output profile. Thus, the re-created white conversion table 420 is used in the print data generation process, while the color conversion table 410 is defined to be the conversion table Z, which is used in a following process.

Hereinafter, a data processing method to create the color conversion table 410 based on the conversion table Z and the sRGB values of the ground color will be explained. In the color conversion table 410, as the sRGB values of the input pixels are closer to the ground color of the recording medium, the W values corresponding to the sRGB values become smaller, will be explained. FIG. 10 is a flowchart of a color ink level adjustment process according to the second embodiment of the invention. Optionally, the following color ink level adjustment process may be executed by a computer other than the personal computer 800.

Figure 10:
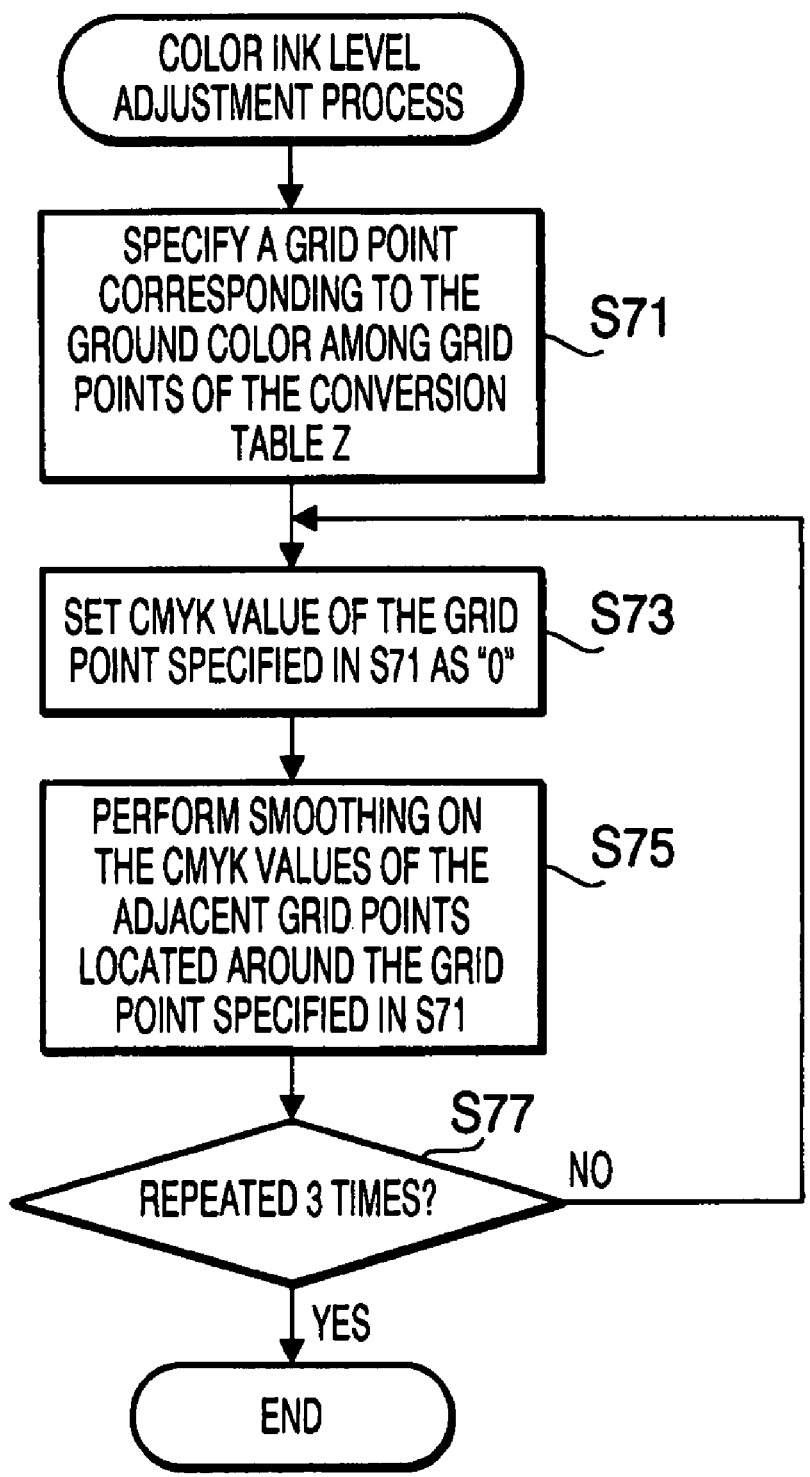
FIG. 10 is a flowchart of a color ink level adjustment process according to the second embodiment of the invention.

As shown in FIG. 10, in the color ink level adjustment process, when the supplier inputs the sRGB values of the ground color, a grid point corresponding to the sRGB values of the ground color is specified among the grid points in the conversion table Z (S71). In the conversion table Z, grid points of the five steps of R values, G values, and B values (total 125 values) are provided in the three-dimensional sRGB color space. Therefore, similarly to S51 in FIG. 9, when the sRGB values of the ground color are located on any one of the 125 grid points, the grid point is specified.

Next, the CMYK values corresponding to the grid point specified in S71 are set to be the minimum level "0, 0, 0, 0" (S73). This means, all the CMYK values corresponding to the grid points specified in the step S71 are set to be "0, 0, 0, 0" in S73, while the CMWK values are set correspondingly to the grid points of the 125 sRGB values respectively in the conversion table Z Next, smoothing is performed on the CMYK values of the grid points located around the grid point specified in S71 (S75). That is, similarly to S55 in FIG. 9, smoothing is performed on the grid point specified in S71 and the adjacent grid points located in a distance which is equal to or less than the threshold so that the averaged CMYK value is set to be the CMYK value of these grid points.

Subsequently, it is judged as to whether the steps from S73 to S75 have been repeated for three times (S77). If not, (S77: NO), the process returns to S73. Thereafter, the CMYK values corresponding to the grid point specified in S71 is set to be the minimum level "0, 0, 0, 0" again (S75), and smoothing is performed on the CMYK values around the grid point of which CMYK value was set to be "0, 0, 0, 0" in S73 (S77). If above process has been repeated for three times (S77: YES), the color ink level adjustment process is terminated.

According to the above-described color ink level adjustment process, in the conversion table Z, the CMYK values corresponding to the sRGB values of the ground color and the adjacent sRGB values are updated to be the lower color ink level. Specifically, the CMYK values corresponding to the sRGB values of the ground color are set to be the minimum level "0, 0, 0, 0", and as the distance from the sRGB values of the ground color on the sRGB color space becomes greater, the CMYK values corresponding to the respective adjacent sRGB values become greater. In other words, definitions of the conversion table Z are updated so that the closer values between the sRGB values of the input pixel and the sRGB values of the ground color become the smaller CMYK values corresponding to the input pixel. Thus, the re-created color conversion table 410 is used in the print data generation process.

The color conversion tables 410 and the white conversion tables 420 created as described above define the optimal CMYK values corresponding to the sRGB values and the optimal W value corresponding to the sRGB values respectively for the recording medium being use (i.e., the blue T-shirt in the present embodiment). Therefore, in the print data generation process (see FIG. 8), the converted CMYKW data 340, wherein each pixel configuring the input RGB data 310 in the sRGB format is converted into the optimal CMYK values and the optimal W value, is created. Thus, an image in higher reproducibility is printed, even the ground color of the fabric is other than white, as the printing is performed based on the print data 350.

Additionally, in the white conversion table 420, as the sRGB values of the input pixel become closer to the ground color of the recording medium, the lower level of W values is defined correspondingly to the sRGB values of the input pixel. Also, in the color conversion table 410, as the sRGB values of the input pixel become closer to the ground color of the recording medium, the lower level of CMYK values are defined correspondingly to the sRGB values of the input pixel. Therefore, when printing is performed based on the print data 350, amounts of ejected white ink and colored inks are small in an area having a color close to the ground color of the recording medium. Specifically, the white ink and colored inks are not ejected onto an area having a color identical to the ground color on the recording medium. Therefore, an image based on the print data 350 is printed with the optimal amount of inks so that an image with high reproducibility can be achieved at high speed yet low cost.

As thus far described, similarly to the first embodiment, in the personal computer 800 according to the present embodiment, a plurality of input pixels which compose the input RGB data 310 are converted into the color ink level data 320, which is further converted into the CMYK values corresponding to the respective sRGB values and the white ink level data 330, which is further converted into the W value corresponding to the respective sRGB values, based on the color conversion table 410, which is defined by the CMYK values corresponding to the sRGB values, and the white conversion table 420, which is defined by the W value corresponding to the sRGB values. Then, the print data 350 which is used for printing in the colored inks (CMYK) and in the white ink (W) in the inkjet printer 1 is created based on the converted CMYKW data 340 which consists of the color ink level data 320 and the white ink level data 330. Thus, the print data 350 to print the image being with higher reproducibility at high speed yet low cost without being affected by the feature of the recording medium, can be created.

Further, the input pixels having the same or proximate sRGB values to the blue color of the T-shirt among a plurality of input pixels in the input RGB data 310 are converted into the CMYKW values in lower level according to the color conversion table 410 and the white conversion table 420. Therefore, the print data 350, in which the input pixels having the same the sRGB values with the blue color of the T-shirt are not to be printed and the input pixels having the closer sRGB values to the blue color of the T-shirt with the lower ink level are printed, is created. Thus, as the sRGB values of the input pixels become closer to the blue color of the T-shirt, usage amounts of the white ink and the colored inks decrease so that the image can be reproduced in the white scale and color scale (in gradation) on the T-shirt as a recording medium.

Figure 12:
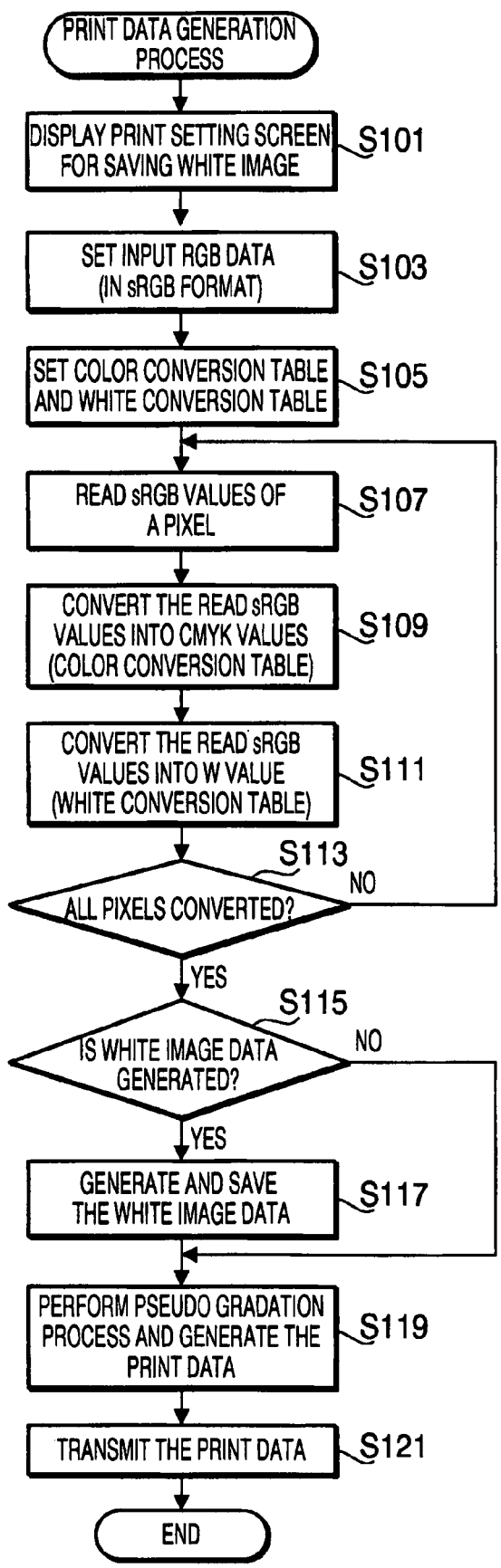
FIG. 12 is a flowchart of a print data generation process according to the third embodiment of the invention.

Hereinafter, referring to FIGS. 11-13, a third embodiment of the present invention will be described. A personal computer 900 (see FIG. 3) according to the present embodiment is generally similar to the personal computers 200, 800 in the previous embodiments, except the white ink level data 330 being created and stored as white image data. In the third embodiment, a configuration of the personal computer 900 which is similar to the configuration of the previous embodiments is referred to by an identical reference numeral, and description of that will be omitted.

First, each data to be generated in the print data generation process according to the present embodiment will be described. FIG. 11 shows transition of data in the print data generation process according to a third embodiment of the invention. As shown in FIG. 11, data transition in the print data generation process according to the present embodiment is similar to the data transition described in the first embodiment (see FIG. 6), except that the white image data 500 is created by creating the white ink level data 330 based on the input RGB data 310 and converting the created white ink level data 330 into image data which can be displayed in the monitor 271 through an imaging process.

Hereinafter, a print data generation process executed in the personal computer 900 will be described. FIG. 12 is a flowchart of the print data generation process according to the third embodiment of the invention. FIG. 13 shows an illustrative embodiment of a print setting screen for saving white image 600 according to the third embodiment of the invention. As shown in FIG. 12, in the print data generation process according to the present embodiment, a print setting screen for saving white image 600 is displayed on the monitor 271 as the user instructs printing execution of the image data (S101).

Figure 13:
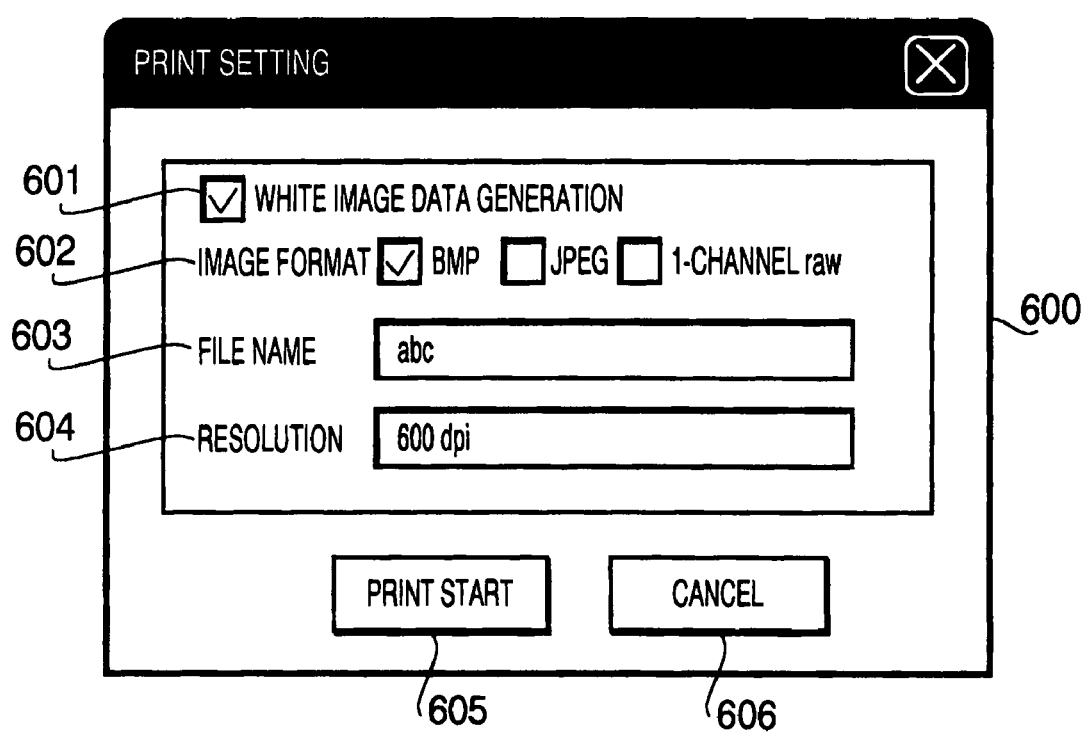
FIG. 13 shows an illustrative embodiment of a print setting screen for saving white image 600 according to the third embodiment of the invention.

As shown in FIG. 13, the print setting screen for saving white image 600 is a dialog window wherein the user sets arbitrarily configuration of the white image data 500 to be created. The print setting screen for saving white image 600 is provided with a white image data generation specifying checkbox 601 for issuing an instruction of creating the white image data 500, image format selecting checkboxes 602 for selecting an image format of the white image data 500, a file name designating field 603 for designating a file name of the white image data 500, a resolution specifying field 604 for specifying resolution of the white image data 500, a printing start button 605 for determining the settings in the print setting screen for saving white image 600, and a cancel button 606 for canceling the settings in the print setting screen for saving white image 600 and for terminating the print data generation process (see FIG. 12).

With the print setting screen for saving white image 600 displayed in S101, the user is prompted to input arbitrary instructions by using the keyboard 281 and the mouse 282. When the printing start button 605 is pressed with the white image data generation specifying checkbox 601 being checked, a white image data generation flag (not shown) stored in the RAM 230 is set "ON". Further, when the printing start button 605 is pressed with the white image data generation specifying checkbox 601 being unchecked, the white image data generation flag is set "OFF".

Next, similarly to the steps from S1 to S11 (see FIG. 8) of the first embodiment, the input RGB data 310 in the sRGB format is converted into the converted CMYKW data 340 in the CMYKW format (S103-S113). In S113, if all the pixels are converted (S113: YES), it is judged as to whether the white image data 500 is to be created (S115). In S115, it is judged as to whether the white image data 500 is to be created based on the aforementioned white image data generation flag.

When the image data generation flag is set "ON" (S115: YES), an imaging process is executed on the white ink level data 330 stored in the converted CMYKW data storing area 232, and the white image data 500 is created and saved (S117). The imaging process to be executed in S117 varies depending on the contents of the print setting screen for saving white image 600 set in S101.

Specifically, in S117, the input RGB data 310 is resamled in the resolution specified in the resolution specifying field 604 (600 dpi, in the present embodiment). Thereafter, the white ink level data 330 is created by converting each pixel which composes the newly-sampled input RGB data 310 into a white ink level (i.e., the W value) respectively using the white conversion table 420 in a manner similar to S111. Next, when the image format selected in one of the image format selecting boxes 602 is either "BMP" or "JPEG", the RGB values of each pixel which composes this white ink level data 330 is obtained based on the W value in an equation as below.

$$R=G=B=W$$

Further, the white image data 500 is created in either of the specified "BMP" or "JPEG" file format based on the RGB values of each pixel. This white image data 500 is saved in the white image data storing area 256 in the HDD 250 in the designated file name in the file name designating field 603 (i.e., "abc" in the present embodiment). In the white image data 500 created and saved in this manner, the R value, G value, and B value of each pixel are in an equivalent level to the W value, therefore each pixel is displayed in gray in the monitor 271. That is, the white image data 500 represents a gray-scaled image displaying the white ink level of each pixel in shading of gray.

If the image format selected among the image format selecting checkboxes 602 is "1-channelled raw" (see FIG. 13), the white image data 500 without a header is created maintaining the W value of each pixel unchanged. This white image data 500 is saved in the white image data storing area 256 in the HDD 250 in the file name designated in the file name designating field 603 with the numbers of horizontal pixels and vertical pixels added. For example, if the designated file name is "abc", the number of vertical pixels is "2000", and the number of horizontal pixels is "3000", the file name of the white image data 500 is "abc_x3000y2000.raw".

As described above, the white image data 500 saved in the white image data storing area 256 can be displayed on the monitor 271 of the personal computer 900 and on a monitor of other computers using image displaying application software. Therefore, the user can visually recognize the white ink level of each pixel to be printed based on the print data 350 as a white image. Specifically, in the white image displayed on the monitor, the higher white ink level is displayed whiter, and the lower white ink level is displayed darker, thus the user can recognize the white scale (gradation) of the image easily.

Further, the user can arbitrarily specify as to whether the white image data 500 should be created, and the resolution and image format within the print setting screen for saving white image 600. Therefore, the white image data 500 which is in a desired configuration to meet the user's needs can be obtained.

As thus far described, in the personal computer 900 according to the third embodiment, a plurality of input pixels which compose the input RGB data 310 are stored to be the white image data 500 as the white ink level data 330 being processed to be an image representing the white ink level data 330, wherein the plurality of input pixels are converted into the W values corresponding to the sRGB values based on the white conversion table 420 defining the W values which correspond to the sRGB values. Thus, the user can visually recognize how the image data to be printed in the white ink will appear by referring to the white image data 500.

Furthermore, the user can arbitrarily specify as to whether the white image data 500 should be created, and the resolution and image format within the print setting screen for saving white image 600. Therefore, the white image data 500 which is in a desired configuration to meet the user's needs can be obtained and the user can edit the white image data 500 arbitrarily.

In addition, the print data 350 which is used for printing in the colored inks and in the white ink in the inkjet printer 1 is created based on the converted CMYKW data 340 which consists of the color ink level data 320 and the white ink level data 330. Thus, the user can execute image printing by the inkjet printer 1 based on the print data 350 after checking how the image data to be printed in white ink by the white image data 500 will appear.

Although examples of carrying out the invention have been described, those skilled in the art will appreciate that there are numerous variations and permutations of the inkjet printer that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiments described above, the blue T-shirt is used as a recording medium, however, the present invention may be applied also to another recording medium such as recording paper and labels. Further, the ground color is not limited to blue, but different colors such as red and black as well as white are also available. Furthermore, the inkjet printer 1 may be replaced with another printing apparatus that records an image on a recording medium in the other recording methods, such as laser printing using toner.

In the embodiments described above, the color conversion table 410 and the white conversion table 420 are used for converting image data in the sRGB format into print data in the CMYKW format, however, different data formats may be arbitrarily selected. For example, the image data may be data on the other color space such as the CMYK format and the HSV format, and the print data may be data in the other color space such the RGB format and the HSV format depending on the recording method of the printer being used. In addition, the color conversion table 410 and the white conversion table 420 may be modified as long as correspondence of data format is defined so that the image data and the print data are convertible.

Additionally, in the first embodiment, the supplier defines a low level of W values corresponding to the sRGB values which are identical or similar to the color of the recording medium only on the white conversion table 420. However, the supplier may define a low level of CMYK values corresponding to the sRGB values which are identical or similar to the color of the recording medium also on the color conversion table 410. In this manner, similarly to printing in the white ink, the input pixels having the identical or similar sRGB values to the color of the recording medium may be lowered in the CMYK values, thus the usage amounts of colored inks can be optimally adjusted at the time of image printing.

In the second embodiment, smaller CMYK values and a smaller W value are set automatically by a computer to the sRGB values which are similar to the color of the recording medium on both of the color conversion table 410 and the white conversion table 420. However, in a similar manner as described in the first embodiment, a smaller W value can be defined correspondingly to the sRGB values which are similar to the recording medium only on the white conversion table 420. In addition, the smoothing process (S55 in FIG. 9 and S75 in FIG. 10) is not limited to the aforementioned method, but a different method can be employed as long as smoothing can be performed on the grid points and the adjacent W value and CMYK values corresponding to the ground color appropriately.

Furthermore, in the third embodiment, the white image data 500 is created after resampling the input RGB data 310, however, the white image data 500 may be created based on the white ink level data 330 in the converted CMYKW data storing area 232. In addition, the resolution and image format of the white image data 500 are not limited to the abovementioned resolution and image format, but may be determined arbitrarily. For example, the white image data 500 is not limited to the 1-channelled image data such as a gray scale format, but the 3-channelled image data like RGB format is also available.

What is claimed is:

1. A print data generating apparatus to generate print data which is used for printing in a printing apparatus based on image data, comprising:
   a conversion table storing system, which stores a white conversion table defining a white colorant level corresponding to color information of each of a plurality of pixels that configure the image data, the white colorant level indicating a level of white colorant to be used in the printing apparatus;

a colorant data generating system, which generates white colorant data wherein color information of each of the plurality of pixels is converted into the white colorant level according to the white conversion table; and a print data generating system, which generates white print data to be used for printing with the white colorant in the printing apparatus based on the white colorant data.

2. The print data generating apparatus according to claim 1, wherein the colorant data generating system converts the color information of the pixels in the image data having one of identical color information and close color information to the color of a recording medium on which the image is formed in the printing apparatus into a lower white colorant level with a lower density of the white colorant than the white colorant level of the pixels in the other areas in the image data.

3. The print data generating apparatus according to claim 2, wherein the white conversion table defines the white colorant level of the pixels in the image data having one of identical color information and close color information to the color of a recording medium on which the image is formed in the printing apparatus to be the lower white colorant level with the lower density than the pixels in the other areas in the image data.

4. The print data generating apparatus according to claim 2, wherein the conversion table storing system stores a color conversion table defining a non-white colorant level of each pixel in the image data according to the color information of the pixels in the image data, the non-white colorant level indicating a level of a non-white colorant to be used in the printing apparatus;

wherein the colorant data generating system generates non-white colorant data in which the color information of each of the plurality of pixels in the image data is converted into the non-white colorant level of the non-white colorant based on the color information of each of the plurality of pixels according to the color conversion table;

wherein the print data generating system generates non-white print data to be used for printing with the non-white colorant in the printing apparatus based on the non-white colorant data; and wherein the colorant data generating system converts the color information of the pixels in the image data having one of identical color information and close color information to the color of a recording medium into a lower non-white colorant level with a lower density of the non-white colorant than the non-white colorant level of the pixels in the other areas in the image data.

5. The print data generating apparatus according to claim 4, wherein the print data generating system generates the white print data and the non-white print data in which a printing operation in the printing apparatus is controlled so that the pixels having identical color information to the color of the recording medium are maintained unprinted while the pixels having close color information to the color of the recording medium are printed in the lower level of the non-white colorant level with lower densities of the non-white colorant than the non-white colorant level of the pixels in the other areas in the image data.

6. The print data generating apparatus according to claim 1, wherein the conversion table storing system comprises a plurality of the white conversion tables, each of which corresponds to the recording medium and a table selection system, wherein one of the plurality of the white conversion tables is arbitrarily selected, and wherein the colorant data generating system converts the color information of the pixels in the image data into the white colorant level based on the white conversion table selected in the table selection system.

7. The print data generating apparatus according to claim 6, wherein maximum values of the white colorant levels, each of which is defined according to the corresponding recording medium, vary among the plurality of the white conversion tables.

8. The print data generating apparatus according to claim 1, wherein the recording medium is a piece of fabric.

9. The print data generating apparatus according to claim 1, wherein the printing apparatus is an inkjet printer which executes printing by ejecting ink from an inkjet head onto the recording medium.

10. An image processing apparatus which processes image data, comprising:

a conversion table storing system, which stores a white conversion table defining a white colorant level corresponding to color information of each of a plurality of pixels that configure the image data, the white colorant level indicating a level of white colorant to be used in the printing apparatus;

a colorant data generating system, which generates white colorant data wherein color information of each of the plurality of pixels is converted into the white colorant level according to the white conversion table; and an image saving system, which applies an imaging process to the white colorant data and saves the processed data as white image data.

11. The image processing apparatus according to claim 10, wherein the white image data is one of 1-channelled image data and 3-channelled image data.

12. The image processing apparatus according to claim 10, comprising a resolution specifying system, which arbitrarily specifies a resolution of the white image data;

wherein the image saving system converts a resolution of the white colorant data into the resolution specified by the resolution specifying system and saves the white colorant data in the converted resolution as the white image data when the resolution is specified by the resolution specifying system.

13. The image processing apparatus according to claim 10, comprising an image format specifying system, which arbitrarily specifies an image format of the white image data;

wherein the image saving system converts an image format of the white colorant data into the image format specified by the image format specifying system and saves the white colorant data in the converted image format as the white image data when the image format is specified by the image format specifying system.

14. A print data generating apparatus, comprising:

an image processing apparatus to process image data, having a conversion table storing system, which stores a white conversion table defining a white colorant level corresponding to color information of each of a plurality of pixels that configure the image data, the white colorant level indicating a level of white colorant to be used in the printing apparatus, a colorant data generating system, which generates white colorant data wherein color information of each of the plurality of pixels is converted into the white colorant level according to the white conversion table, and an image saving system, which applies an imaging process to the white colorant data and saves the processed data as white image data, wherein white print data to be used for printing with the white colorant in the printing apparatus based on the white colorant data is generated.

15. The print data generating apparatus according to claim 14, wherein saving the white image data by the image saving system and generating the white print data by the print data generating system are executed substantially simultaneously based on the white colorant data.

16. The print data generating apparatus according to claim 15, comprising a saving specifying system, which specifies as to whether the white image data is to be saved substantially simultaneously while the white print data is generated by the print data generating system.

17. A computer usable medium comprising computer readable instructions for controlling a computer to generate print data which is used for printing in a printing apparatus based on image data by executing steps of:

storing a white conversion table which defines a white colorant level corresponding to color information of each pixel in image data, the white colorant level indicating a level of white colorant to be used in the printing apparatus;

generating white colorant data wherein color information of each pixel in the image data is converted into the white colorant level according to the white conversion table; and generating white print data to be used for printing with the white colorant in the printing apparatus based on the white colorant data.

18. A computer usable medium comprising computer readable instructions for controlling a computer to process image data by executing steps of:

storing a white conversion table which defines a white colorant level corresponding to color information of each pixel in image data, the white colorant level indicating a level of white colorant to be used in the printing apparatus;

generating white colorant data wherein color information of each pixel in the image data is converted into the white colorant level according to the white conversion table; and saving the white colorant data which is applied an imaging process as white image data.

* * * * *